US012795366B2

(12) United States Patent
Ly et al.

(10) Patent No.: US 12,795,366 B2
(45) Date of Patent: Nov. 10, 2026

(54) MANAGING ROLE CHANGES IN PERSONAL IoT NETWORKS

(71) Applicant: IPLA Holdings Inc., New York, NY (US)

(72) Inventors: Quang Ly, North Wales, PA (US); Dale Seed, Allentown, PA (US); Lu Liu, Conshohocken, PA (US); Catalina Mladin, Hatboro, PA (US)

(73) Assignee: IPLA HOLDINGS INC.

( * ) Notice: Subject to any disclaimer, the term of this patent is extended or adjusted under 35 U.S.C. 154(b) by 33 days.

(21) Appl. No.: 18/874,776

(22) PCT Filed: Jun. 14, 2023

(86) PCT No.: PCT/US2023/068410
§ 371 (c)(1),
(2) Date: Dec. 13, 2024

(87) PCT Pub. No.: WO2023/245038
PCT Pub. Date: Dec. 21, 2023

(65) Prior Publication Data

US 2025/0365577 A1 Nov. 27, 2025

Related U.S. Application Data

(60) Provisional application No. 63/352,316, filed on Jun. 15, 2022.

(51) Int. Cl.
*H04W 12/08* (2021.01)
*H04W 48/08* (2009.01)
*H04W 84/18* (2009.01)

(52) U.S. Cl.
CPC .......... *H04W 12/08* (2013.01); *H04W 48/08* (2013.01); *H04W 84/18* (2013.01)

(58) Field of Classification Search
USPC .............................................................. 726/1
See application file for complete search history.

(56) References Cited

U.S. PATENT DOCUMENTS

2017/0063931 A1* 3/2017 Seed .................... G06Q 20/401
2021/0084043 A1* 3/2021 Zavesky ............... H04L 63/102
(Continued)

FOREIGN PATENT DOCUMENTS

CN 119732028 A * 3/2025 ........... H04L 67/148

OTHER PUBLICATIONS

3GPP TR 23.700-78, "Study on Application Layer Support for Personal IoT Network", V0.3.0, May 2022, pp. 33.
(Continued)

*Primary Examiner* — Sakinah White-Taylor
(74) *Attorney, Agent, or Firm* — XSENSUS LLP

(57) ABSTRACT

Methods for managing personal IoT networks (PINs) are described herein. In one aspect, a method may include determining, by a personal IoT network (PIN) Element Management Capability (PEMC) of a PIN, a PIN Element Gateway Capability (PEGC) of the PIN is not within a coverage area of the PIN: sending, by the PEMC and to a PIN server, a request for the PIN server to perform a PEGC role change; and receiving, by the PEMC and from the PIN server, a notification that a PIN element (PINE) of the PIN is selected to perform PEGC functions for the PIN.

16 Claims, 16 Drawing Sheets

(56) References Cited

U.S. PATENT DOCUMENTS

| | | | | |
|---|---|---|---|---|
| 2021/0092597 A1* | 3/2021 | Sharma | ............. | H04W 12/0433 |
| 2024/0314534 A1* | 9/2024 | Shi | ......................... | H04W 76/14 |
| 2025/0159589 A1* | 5/2025 | Zhang | ................... | H04W 60/00 |
| 2025/0219837 A1* | 7/2025 | Liang | .................... | H04L 9/3226 |

OTHER PUBLICATIONS

VIVO, "Mega editorial modification on TR 23.700-88 v0.2.0", 3GPP TSG-WG SA2 Meeting #151E e-meeting, S2-2205225, May 2022, pp. 51.

VIVO, "Update for Solution 2 in KI#1—PIN modification", S6-221480, 3GPP TSG-SA WG6 Meeting #49-e, May 2022, pp. 55.

* cited by examiner

MANAGING ROLE CHANGES IN PERSONAL IoT NETWORKS

CROSS-REFERENCE TO RELATED APPLICATIONS

This application is the National Stage Application of International Patent Application No. PCT/US2023/068410, filed Jun. 14, 2023, which claims priority to U.S. Provisional Application No. 63/352,316, filed Jun. 15, 2022 and titled "Managing Role Changes in Personal IoT Networks", the disclosure of which is incorporated herein by reference in its entirety.

BACKGROUND

IoT devices are becoming ubiquitous as more companies release new products in different market segments and consumers adopt the technology in their home and for personal use. Devices such as those in smart homes, e.g. large and small appliances, lighting and switches, security cameras, motion and water detectors, meter readers, door locks and garage door openers, as well as personal wearables such as AV/VR glasses, headsets and headphones, medical and health sensors, are beginning to be widely adopted by consumers for their utility and convenience. 3GPP has recognized the burgeoning market opportunities and have initiated various works within the standards organization to support the creation of Personal IoT Networks (PIN) that connects the IoT devices together for communications within the PIN and outside of the PIN.

One such work is found in 3GPP SA6 working group in which application enabler layers are defined to specify application layer APIs to assist companies to incorporate 3GPP technologies quickly and easily into their products. An SA6 study has commenced to define application enabler functionalities for supporting personal IoT network applications called PINAPP. The result of this study is captured in 3GPP TR 23.700-78.

FIG. 1 shows the proposed PINAPP architecture defined in 3GPP TR 23.700-78. The architecture defines the PINAPP application enabler layer for managing personal IoT networks. A PIN server is deployed by a network operator in a data network to provision configuration information to PINAPP clients on UEs and to authorize the creation of PINs. PIN Elements with Management Capabilities (PEMC) and PIN Elements with Gateway Capabilities (PEGC) are responsible for PIN management and traffic routing, respectively, for the PIN and PIN Elements (PINE) are IoT devices that are members of the PIN. Within a PIN element, there may be one PIN client and one or more Application clients per PIN client.

A PIN element is an IoT device that may have a SIM card with an associated 3GPP subscription, or a PIN element may be a 3GPP device that does not have a SIM card. In addition, a PIN element may be a non-3GPP device that operates using different access technologies, such as wifi and Bluetooth. For PIN elements without a SIM card and an associate 3GPP subscription, the devices need to be provisioned with a 3GPP defined user identifier in order to use the 5G network and its services.

PIN communications may occur over operator managed spectrum such as that used by Uu and PC5 interfaces or over non-operated managed spectrum such as wifi and Bluetooth. The Uu interface is defined as the radio interface between a UE and a RAN node, or a base station, and the PC5 interface is defined as the radio interface between two UEs. Both interfaces use 3GPP defined access technologies.

Prior to the creation of a PIN, a PEMC may obtain authorization from a PIN server that is managed by an operator. The PEMC may be controlled by an authorize administrator or user, e.g, a homeowner or a family member of the homeowner who wants to create PINs in the home. Upon authorization, a PEMC may then be able to create and delete PINs and to add or remove members to a PIN. The PEMC may also designate a PIN element to become a PEGC in order to provide data traffic routing functionality to the PIN. Routing in this case may be for intra-PIN, inter-PIN, and through the 5GS, or 5GS-PIN. Intra-PIN routing is between members of a PIN, inter-PIN routing is between members of two different PINs, and 5GS-PIN routing is between a member of a local PIN to a remote PIN member (e.g, a UE) over the 5G network. The remote PIN member may be a member of the local PIN or have been authorized by a PIN server to access the local PIN. In addition to using a PEGC to route intra-PIN traffic, a PIN element may also communicate directly with another PIN element within the PIN if it is authorized to do so. A PIN element that is a non-3GPP device and wants to join a PIN must be assigned a user identifier by the PEMC in order to communicate over the 5G network and to use the services of the 5G network.

3GPP TR 23.700-78 has identified several key issues to be solved on the management and operations of PINs. An important consideration for creating PINs is obtaining authorization from a PIN server. Upon authorization, a PIN Profile may be provided to a PEMC to assist the PEMC with the management of the PIN upon creation. The current proposed PIN Profile only offers basic information on the members and construction of the PIN, e.g. contact information and identification of PIN members. No management information is provided to assist the PEMC with the actual management aspects of PIN operations.

In addition, PIN operations may be dynamic and the initial assignment of PEMC and PEGC functions may change as time progresses. For example, an authorized administrator may need to perform a software update of a PEMC or even a complete device upgrade. Similarly, a PEGC may leave the local area of a PIN and the routing functionality for PIN communications may be unavailable. Furthermore, the PEMC or PEGC may fail unexpectedly and cause interruptions to the management or traffic routing of the PIN. As a result, these examples show that PIN role change is required in order to address dynamic changes to the operation of PINS.

SUMMARY

Disclosed herein is a method for a PIN client functioning in the role of a PEMC to: send a request for authorization to a PIN server for creating Personal IoT Networks (PIN): receive a response with authorization to create PINs, included in the response is a PIN profile containing information to manage the PINs, the management information comprising one or more of: PIN ID, PEMC and PEGC information, PIN Element list, policy expiration, heartbeat timer, PIN location, PIN Element ID list, role change configuration, role change sequence, PIN routing authorization, data traffic limit, subscription ID, maximum number of PINs, operator policy for PIN management, usage record collection, and refresh interval; receive a PIN registration request from a PIN element to become a member of the PIN, the registration request includes one or more of PINE user type, PINE capability, member persistency, device identifier, device type and information, device lifetime, battery level, sleep cycle, PINE location, and access type: send a registration response to the PIN element that includes one or more of a PIN element ID, PINE location, sleep cycle, a heartbeat timer, and routing authorization information; and send a PIN policy update request, comprising one or more information elements defined in Table 1 or Table 2, to a PIN server with updated PIN membership information: where the request may be triggered by an addition of one or more PIN members or a refresh interval expiring.

Disclosed herein is a method for a PIN client located within the local coverage area of a PIN to: detect an event that a PEMC or PEGC is unavailable in the PIN; change the role of a PIN member, where changing the role is to assign a role of PEMC or PEGC to another member, or to assume the role of the PEMC or PEGC: perform a PIN policy update to the PIN server if required by a policy, wherein an update of a PIN policy comprise of a change to one or more of: PIN ID, PEMC or PEGC information, PIN Element list, policy expiration, heartbeat timer, PIN location. PIN Element ID list, role change configuration, role change sequence. PIN routing authorization, data traffic limit, subscription ID, maximum number of PINs, operator policy for PIN management, usage record collection, and refresh interval; and send a notification to all members of a PIN of the role change Disclosed herein is a method for a PIN client located outside of the local area network of the PIN to: detect that the PEMC or PEGC is unavailable in the PIN; and send a request to a PIN server to initiate a PEMC or PEGC role change, where the request may include one or more of a UE ID, a PIN ID, an indication for a role change of either the PEMC or the PEGC for the PIN, a role change token for authorizing the role change, the PINE identifier selected for the new role, a reason for the role change.

Disclosed herein is a method for a PIN server to: be configured with a PIN profile, wherein the PIN profile comprise one or more of: PIN ID, PEMC and PEGC information, PIN Element list, policy expiration, heartbeat timer, PIN location, PIN Element ID list, role change configuration, role change sequence, PIN routing authorization, data traffic limit, subscription ID, maximum number of PINs, operator policy for PIN management, usage record collection, and refresh interval: receive a request for authorizing the creation on PINs from a PEMC, the request comprising one or more of a UE identifier, subscription information for which to authorize the creation of PINS, the number of PINS requested for authorization, and the number of PIN members requested for authorization; send a response authorizing the creation of PINs, the response including information for the PEMC to create and manage one or more PINs, the information comprised of information from a PIN profile and management configuration information comprise of one or more of: PIN ID, PEMC or PEGC information, PIN Element list, policy expiration, heartbeat timer, PIN location, PIN Element ID list, role change configuration, role change sequence, PIN routing authorization, data traffic limit, subscription ID, maximum number of PINs, operator policy for PIN management, usage record collection, and refresh interval: receive a PIN policy update in which information in a PIN profile is updated with information of PIN management performed by the PEMC.

Disclosed herein is a method for a PIN server to: receive a PIN modification request to perform a PIN role change, the request includes one or more of: PIN ID, PEMC ID, PEGC ID, PIN member ID to serve in the new role of PEMC or PEGC: send a response to the PIN modification request and include information comprising one or more of: PIN ID, PEMC or PEGC information, PIN Element list, policy expiration, heartbeat timer, PIN location, PIN Element ID list, role change configuration, role change sequence, PIN routing authorization, data traffic limit, subscription ID, maximum number of PINs, operator policy for PIN management, usage record collection, and refresh interval.

BRIEF DESCRIPTION OF THE DRAWINGS

FIG. 10A depicts an example communications system in which the methods and apparatuses described and claimed herein may be an aspect of:

DETAILED DESCRIPTION OF ILLUSTRATIVE EMBODIMENTS

With the popularity of IoT devices in the home and personal wearables, the management of Personal IoT Networks (PIN) becomes an important aspect to consider. A user such as a homeowner may deploy many PINs throughout the home and may have additional PINs in the form of personal wearables. Connecting the PINs to cellular networks afford ubiquitous coverage and access to users but also introduces complex management scenarios. The roles of PIN Element with Management Capability (PEMC) and PIN Element with Gateway Capability (PEGC) may change over the lifetime of the PIN and thus PIN role changes may be addressed. Methods described herein address different PIN role change scenarios. The PIN role changes may be initiated by a requesting entity or it may operate autonomously based on configuration. In addition, management informational elements are proposed to be added to PIN profiles to allow PEMC and PEGC to better manage the PIN.

Figure 1:
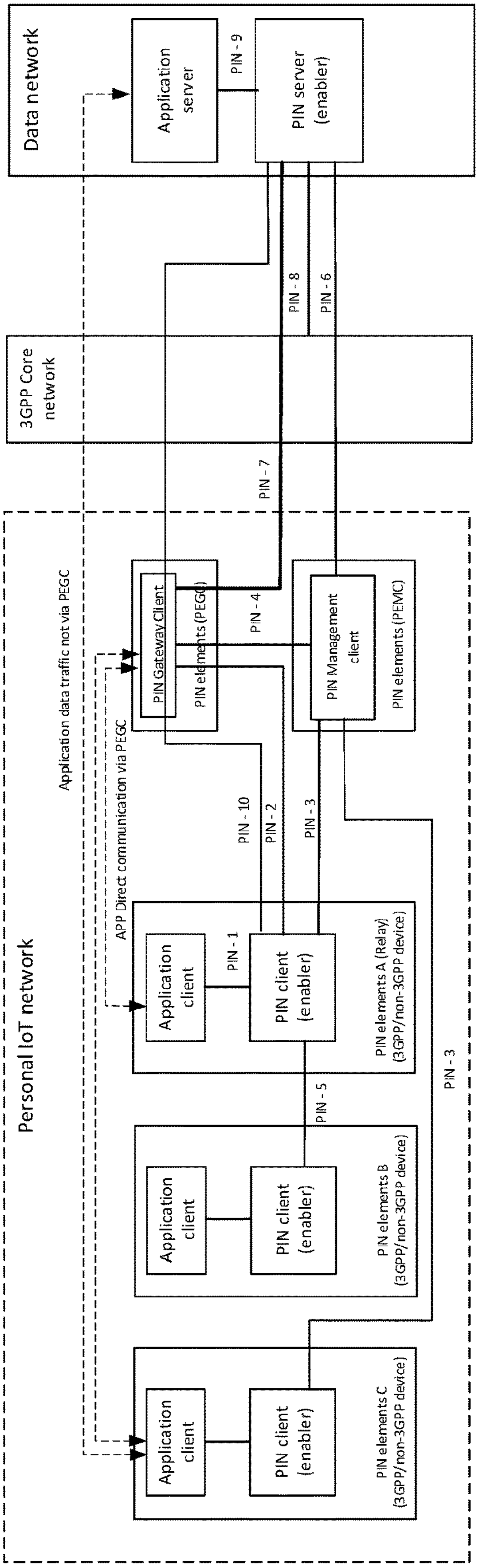
FIG. 1 depicts Person IoT Network Application (enabler layer) (PINAPP) architecture in the 3GPP SA6 working group.
Figure 2:
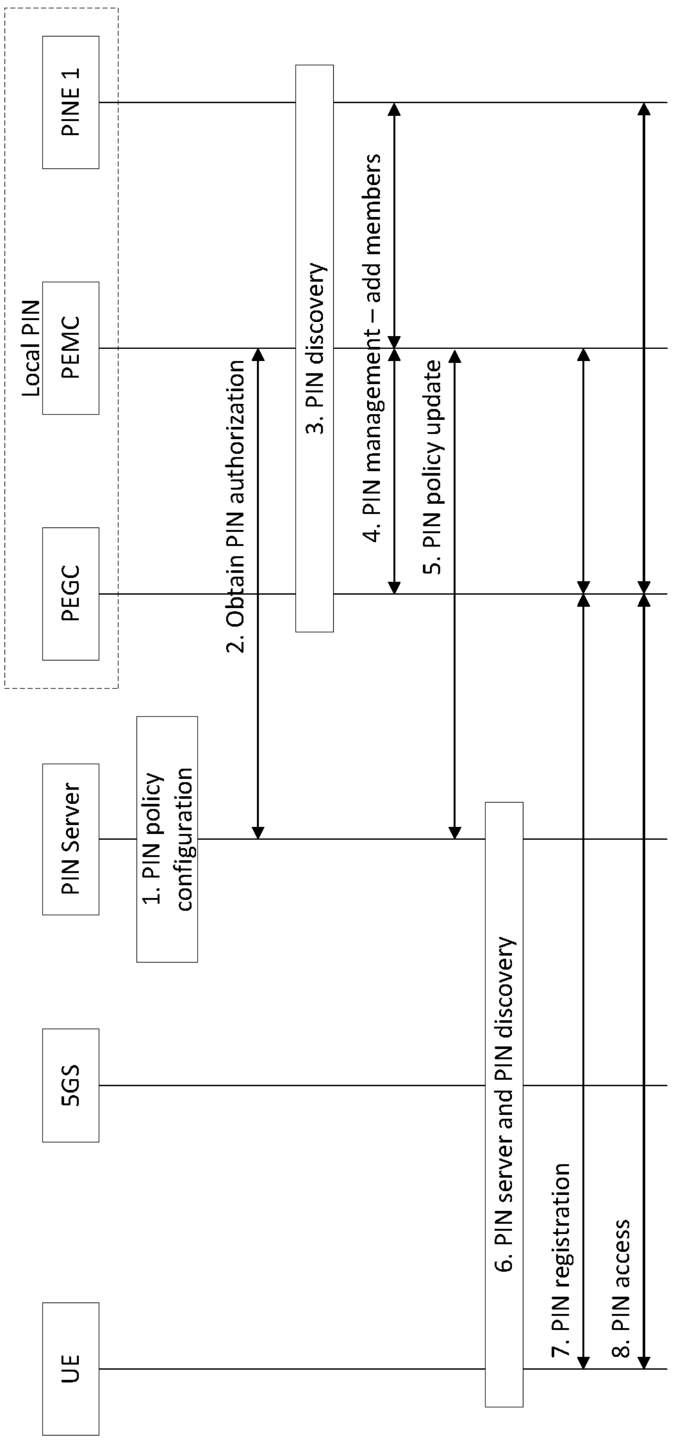
FIG. 2 depicts a process for PIN authorization and registration.

A PEMC may obtain authorization from a PIN server in order to be able to create PINs locally. The PIN server is an operator owned entity that is configured to provide a PIN profile to the PEMC or PEGC for managing the operations of a PIN. FIG. 2 shows the process of a PEMC obtaining authorization for creating PINs from a PIN server and the PIN server providing the PEMC with the PIN profile to manage the PIN. In addition, the process of PIN registration is described as well as PIN server and PIN discovery. Note that the steps in the figure may be performed in an order other than that shown in the figure.

At Step 1, a PIN policy is configured on a PIN server. The PIN policy may contain information as shown in Table 1. The table is based on the PIN profile table in TR 23.700-78 and shows proposed enhancements to the PIN profile in bold text. Note that from the perspective of PIN operations, the terms "PIN policy" and "PIN profile" may refer to the informational elements the PEMC or PEGC is provisioned with and uses to manage PIN(s). The terms "PIN profile" and "PIN policy" may be used inter-changeably hereinafter. Label "Y" in Table 1 indicates that the entity in that column may (optionally) maintain the information in that row and label "N" indicates that the entity in that column may not maintain the information in that row. Note that label "Y" refers to the availability of the informational element to the corresponding PIN entity and does not denote that the informational element is mandatory.

TABLE 1

PIN Profile Enhancements

| Informational Element | Parameter Description | PIN Server | PEMC | PEGC | PINE |
|---|---|---|---|---|---|
| PIN ID | The identifier of the PIN | Y | Y | Y | Y |
| PIN Description | Human-readable description of the PIN, for example, the company name, location or the type of service. | Y | Y | Y | Y |
| PEMC ID list | The list of identifiers of the PIN elements which can be allowed to take the role as PEMC (e.g.: PIN client ID, UE GPSI etc.,) | Y | Y | Y | Y |
| PEMC Endpoint | Endpoint information (e.g. URI, FQDN, IP address) used to communicate with the PEMC. | Y | N | Y | Y |
| PEGC ID list | The list of identifiers of the PIN elements which can be allowed to take the role as PEGC (e.g.: PIN client ID, UE GPSI etc.,) | Y | Y | Y | Y |
| PEGC Endpoint | Endpoint information (e.g. URI, FQDN, IP address) used to communicate with the PEGC. | Y | Y | N | Y |
| PIN Server ID | The identifier of the PIN server that serves the PIN | N | Y | Y | Y |
| PIN server Endpoint | Endpoint information (e.g. URI, FQDN, IP address) used to communicate with the PIN server. | N | Y | Y | Y |
| PIN Elements List | List of PIN elements currently registered/joined the PIN. For each PIN element in the list, information such as but not limited to the following may be included:<br>PIN element ID<br>PINE user type<br>PINE capability (e.g., PEGC, PEMC, both)<br>Member persistency<br>Device identifier<br>Device type and information<br>Device lifetime<br>Battery level<br>Sleep cycle<br>Heartbeat timer<br>Routing authorization<br>PINE location<br>Access type (e.g., 3GPP, non-3GPP or multi-access) | Y | Y | Y | Y |
| Policy Expiration | A timer value in which the PIN Profile expires and PIN traffic needs to cease on operator managed spectrum. The timer value controls the usage of operator manage radio resources for the PIN and may be renewed to enable continuous communications with the operator manage radio resources. | Y | Y | Y | Y |
| Heartbeat Timer | A heartbeat timer may be specified to allow PIN servers to receive periodic communications from either the PEMC or the PEGC to signal a PIN is operational. The heartbeat timer may enable a PIN server to detect when something is wrong with a PIN and as a result, the PIN server may assist with potentially fixing the issue, e.g. to perform a PIN role change. | Y | Y | Y | Y |
| PIN Location | The location of the PIN. The location may be GPS coordinates, street address, and other location identifier that may reveal where PINs may be created including vertical location information such as elevation, floor level, or room of a building. The PIN location may then be used for discovery purposes. | Y | Y | Y | Y |
| PINE ID List | The list of identifiers for which the PEMC may assign to non-3GPP devices, e.g. wifi or Bluetooth devices. The operator may then use the PINE ID to authorize non-3GPP devices for PIN communications. | Y | Y | N | N |

TABLE 1-continued

PIN Profile Enhancements

| Informational Element | Parameter Description | PIN Server | PEMC | PEGC | PINE |
|---|---|---|---|---|---|
| Role Change Configuration | An indication for which the PEMC or PEGC is allowed to apply PIN role change locally within a PIN. Based on operator policy, a PIN Profile update may be required within a suitable time after the role change as indicated by the configured timer value. A token may be required to be provided during PIN Profile update and PIN role change to authenticate and authorize the PIN role change.<br>Role change capability<br>PIN Profile update timer<br>Role change token<br>Role change delegation | Y | Y | Y | Y |
| Role Change Sequence | When role change delegation is enabled, the role change sequence specifies which PIN element should assume the new role of PEMC or PEGC if the current PEMC or PEGC is not available to serve that role. The role change sequence may be divided into separate lists, one for PEMC and one for PEGC. | Y | Y | Y | Y |
| PIN Routing Authorization | PIN routing authorization information indicating whether intra-PIN, inter-PIN, and/or 5GS-PIN routing is enabled. An operator policy may dictate whether this authorization supersedes the individual PIN element routing authorization. | Y | Y | Y | N |
| Data Traffic Limit | An operator may specify a data traffic limit for the whole PIN or for individual members of the PIN. The data traffic limit applies to PIN members using operator managed spectrum. | Y | N | Y | Y |

A policy expiration may be provided to indicate the authorized time period in which the PIN can operate. This expiration timer controls the usage of operator radio resources within the PIN and can be renewed by the PEMC with a PIN policy update request. A heartbeat timer may also be provisioned by the PIN server to request the PEMC or PEGC to periodically report the status of a PIN. The PIN server may use these updates to detect issues with the operations of a PIN and potentially remediate the issue, e.g. by performing a PIN role change.

A PIN location may be reported by the PEMC to the PIN server to indicate the operational location, whether using GPS coordinates, street address, or other location information, of the PIN. Alternatively, an authorized administrator or a PIN server may also provide the PIN location. The PEMC may be provisioned with a PINE ID list in which the PIN server provides a list of identifiers for the PEMC to assign to PIN elements that do not have a SIM card. Typically, these may be non-3GPP IoT devices that mostly communicate using an alternative radio access technology such as wifi and Bluetooth. A PIN element is required to have an operator assigned identifier in order to use operator owned radio resources and services. A PEMC may assign a PINE ID to a PIN element during PIN registration from the pool of PINE IDs the PIN server has authorized. Both the location information and the PINE ID may be used as part of PIN discovery, e.g. by a family member of the authorized administrator, to discover and register to a PIN.

The role change capability informational element is provided to a PEMC if the PIN server authorizes the PEMC to perform local PIN role changes for certain situations. For example, if a PEGC is unavailable due to low battery level or mobility out of the local PIN area, the PEMC may be able to initiate a PIN role change procedure to assign a new PEGC so PIN communications may continue. Similarly, an authorized administrator may want to perform a software or device upgrade of a PEMC and may initiate a PIN role change to assign a new PEMC to manage the PIN. The operator may also include as part of the role change configuration a PIN profile update timer in which the PEMC of the PIN may report the role change to the PIN server within the indicated timer value and provide a specified role change token to authenticate the role change. The PEMC reporting the PIN role change may be the original PEMC of the PIN or the new PEMC of the PIN. In the event that a role change is not reported within the indicated timer value, the PIN Server may intervene and initiate a PIN role change.

PIN communications may use operator owned radio resources and as a result, the PIN profile may include a PIN routing authorization for either the entire PIN or individually for each PIN element. The PIN routing authorization may be specified generally for intra-PIN, inter-PIN, and 5GS-PIN. Intra-PIN routing is for PIN communications within members of a particular PIN while inter-PIN routing refers to local PIN communications between a member of one PIN with another member of a different PIN. 5GS-PIN routing refers to the case where PIN communications are routed externally through the 5G network to another entity. The other entity may be a UE authorized to communicate with the PIN member or it may be a member of a remote PIN. The operator may also specify a data traffic limit for PIN communications to prevent congestion on operator owned radio resources. PIN routing authorization may also be specified as routing rules that is more tailored to a specific device or traffic type. The routing rules may include allowable endpoints such as an application server or data network, location (e.g. certain address, municipality, city, country, etc. or tracking or registration area) and time constraints, traffic type, communication schedule, communication to specific network entities, etc.

At Step 2, an authorized administrator, e.g, a homeowner who is planning to deploy PIN(s) in the home, makes a request to the PIN server via a PEMC to get authorization for creating PINs. The PEMC may be an application client running on a UE or some other PIN device and may have discovered or been provisioned with information to contact the PIN server. The request may include the UE ID, subscription information for which to authorize the creation of PINs, the number of PIN(s) and PIN members requested to be authorized. The PIN server grants the authorization to the PEMC and may provide configuration and PIN policy information for the PEMC to manage the PIN. The PIN policy may include information as shown in Table 1 and the configuration information may include information as shown in Table 2. Note that even though the information from Table 1 and Table 2 are presented separately, the information may be combined together into one policy in which the PEMC is provisioned with and uses to manage PIN(s).

TABLE 2

PIN Management Configuration Information

| Informational Element | Parameter Description |
|---|---|
| Configuration ID | The identifier for the PIN configuration. The identifier should be used by the PEMC in communications with the PIN server when PIN configuration is involved. |
| UE Subscription IDs | The subscription identifiers for which PIN authorization is linked to. The identifiers may be related to a UE ID for which PIN authorization are enabled for. A PEMC may be able to manage multiple PINs and each PIN may be authorized with a different subscription ID. |
| Maximum # PINS | The maximum number of PINs that the PEMC is authorized to manage. |
| Operator Policy for PIN management | A policy informing the PEMC when PIN policy update is required to be performed. The policy may specify an update is required for events such as when adding members, performing PIN role change, at periodic intervals, after a specified number of events, etc. The policy may also include other configurations such as the PIN routing handling between whole policy routing vs individual routing authorizations. |
| Usage record collection | Information of PIN member traffic in which operator resources are used |
| Refresh interval | The interval in which the PEMC needs to update the PIN server with changes to the PIN or to provide usage records of PIN member. |

The configuration information shown in Table 2 may be used by a PEMC as a general management policy the PEMC applies to all PINs it manages, e.g, the subscription IDs that are associated with each PIN and the maximum number of PINs that the PEMC can manage. In addition, the configuration information may include operator policy on how to interact with the PIN server and applicable reporting requirements. Alternatively, the configuration information shown in Table 2 may be specified on an individual PIN basis. In this case, the information may be merged into the PIN Profile shown in Table 1.

At Step 3, PIN discovery may be performed by devices in the vicinity of the PEMC. The PEMC may broadcast discovery information about the PIN to nearby devices. Other discovery procedures may be performed, such as ProSe discovery, wifi discovery, Bluetooth pairing, QR code scan, DNS-SD, mDNS, Bonjour, CORE Resource Directory, etc.

At Step 4, PIN elements interested in joining the PIN may make a registration request to the PEMC and include the UE or device ID. PINE user type. PINE capability, membership consistency, device type and information, device capability, or other information as found in the PIN Elements List informational element of the PIN profile shown in Table 1. Note that the PIN Elements List is shown as an informational element of the PIN profile in Table 1 but the information may be group separately into a PINE profile. A PIN element that has management capability, gateway capability, or both may indicate the capability in the PINE capability information element. This information may be important for the PEMC to consider when making PIN role change decisions. The device specific information and other information such as the battery level and sleep cycle may be provided to the PEMC to assist the PEMC to better manage the PIN element. A PIN element may also request membership persistency during registration to ensure that the PIN element maintains membership even if the PIN element is no longer in the local PIN area. This feature may be useful for PIN elements such as mobile UEs that may frequently leave the local area of the PIN, e.g, a user leaving the home where the PIN is located. The PEMC may return a PIN element ID from the pool provisioned by the PIN server, a heartbeat timer for the PIN element to maintain communications with the PEMC to ensure membership, one or more PIN routing authorization may be provisioned to the PIN element to specify constraints on PIN data traffic, and other information from the PIN profile as shown in Table 1.

At Step 5, after adding members to the PIN, the PEMC may perform a PIN policy update to the PIN server with updated information about the PIN membership. The PEMC may wait until the refresh interval has expired to provide the update along with any usage records of PIN traffic. The PIN policy update may satisfy the heartbeat requirement and reset the timer accordingly to minimize signaling between the PEMC and the PIN server. The PIN policy update procedure may also be used to update the PIN location for cases in which the PIN is mobile, e.g. where the PIN members are personal wearable devices, to renew a PIN profile, to request for more PINE IDs, or to request new PIN routing authorizations. In addition, the PEMC may also perform PIN policy update to a PEGC and/or PINE(s).

At Step 6, a UE that is not part of the PIN may perform a PIN server discovery with the 5GS. The UE may have been provisioned with network slice and data network name information for discovering and creating a PDU session to communicate with a PIN server. Upon discovering the PIN server, the UE may make a PIN discovery request to find a PIN. The user of the UE may be a family member of the authorized administrator and may be provided with certain information about the PIN, e.g, the PIN ID, the PIN location, etc.

At Step 7, the UE may make a registration request to the PEMC through the PEGC. The UE may include information from the Pin Elements List informational element of the PIN profile shown in Table 1. The UE may specify that it is an authorized user of the PIN for the PINE user type and may even request for membership persistency. Other user types may be authorized administrator, guest user, PIN service provider and the services provided, etc.

At Step 8, after registration, the UE may access PINE1 through PEGC if the UE is authorized.

Certain information in the PIN profile shown in Table 1 may be provisioned to members of the PIN during PIN registration or policy update, e.g, the PIN elements list or Policy expiration informational elements. The columns of Table 1 labeled with PIN Server, PEMC, PEGC, and PINE may indicate the information from the PIN profile that each corresponding entity is provisioned with and maintains during the duration of PIN membership. Common information may be synchronized periodically through performing PIN policy update based on the heartbeat timer or some operator-controlled policy.

Figure 3:
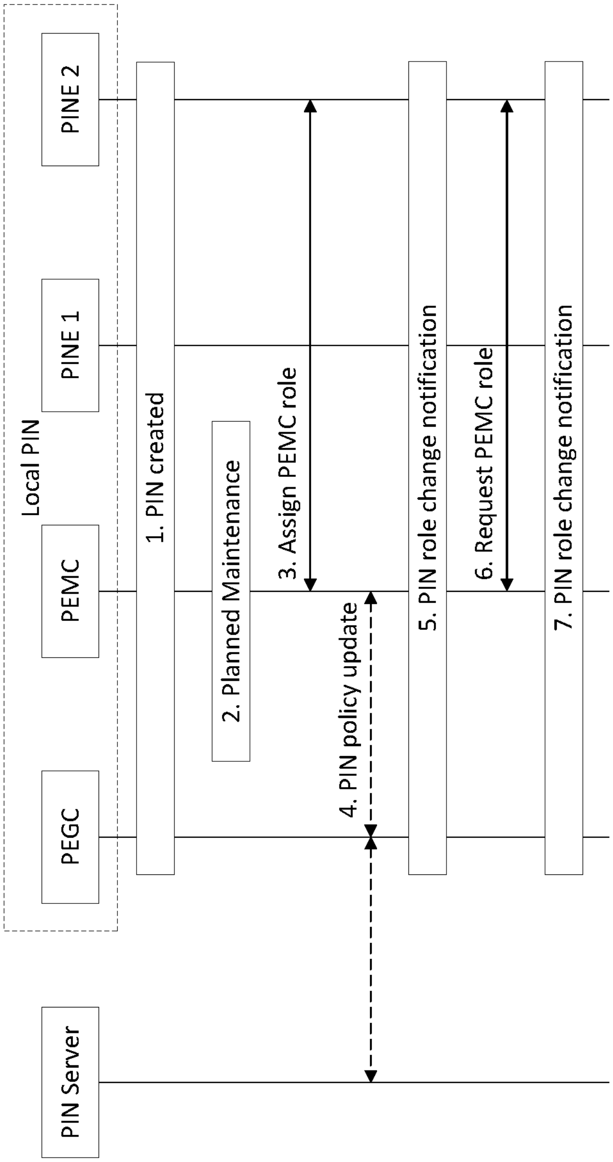
FIG. 3 depicts a process for PIN role change involving a PEMC.

During operations of a PIN, certain events may require a PEMC, a PEGC, or even a PIN server to perform a PIN role change procedure in which a PIN element is identified and assigned a new role of PEMC or PEGC. Some events that may require a PIN role change are the failure of a PEMC or PEGC, a low battery condition, a software or operating system update, a device upgrade, the mobility of a PIN element, etc. FIG. 3 shows an example of a PIN role change involving a PEMC. In the example, an authorized administrator is planning to perform maintenance on the PEMC and initiates the PIN role change to transfer the PEMC functionality to another PIN member. Note that the steps in the figure may be performed in an order other than that shown in the figure.

At Step 1, a local PIN may be created in which there is a PEMC, a PEGC, and two PIN elements PINE1 and PINE2.

At Step 2, the authorized administrator may plan a maintenance operation for PEMC, e.g. to perform a software update or to upgrade the PEMC with a newer model, and configures the PEMC to initiate a PIN role change. This configuration may take place via an administrative API supported by the PEMC.

At Step 3, the PEMC or the authorized administrator may then make a determination that PINE2 should be selected to serve as the new PEMC for the PIN. The PEMC sends a PIN role change request to PINE2 to assign the PEMC role to PINE2. The request may include the PIN profile information that PEMC currently manages and potentially a time duration in which PINE2 should serve as the new PEMC. The request may also include a token which PINE2 may use to authenticate and authorize the PEMC to perform the role change to PINE2. If PINE2 accepts the role change to PEMC, the PINE2 may send a response to PEMC indicating acceptance of the role change.

At Step 4, based on operator policy or other information in the PIN profile, the PEMC may perform a PIN policy update to inform the operator that PINE2 will serve as a new PEMC for the PIN. The PIN policy update may be a PIN modification request and the request may include a PIN ID, the PEMC ID, the PEGC ID, the ID of a PIN member that may serve as the new PEMC, a time duration in which PINE2 will serve as the PEMC and a role change token if one was provisioned in the PIN profile. Other information such as shown in Table 1 and Table 2 may also be included in the request. Alternatively. PINE2 may also send the PIN profile update request and a role change token that may be used for authentication and authorization purposes for the role change. Note that, in some cases, Step 4 may be performed before Step 3 if the operator policy requires the PEMC to obtain authorization for the role change before assigning the role change to PINE2. In that case, the PIN server may provide a new role change token in the response to the request that PEMC may use to request the PEMC function from PINE2 after the maintenance operation is complete. The operator policy may authorize the PEMC autonomous management capability in which the PEMC is able to perform temporary local role changes without performing a PIN policy update such as in this example.

At Step 5, The PEMC or PINE2 may send a PIN role change notification to members of the PIN. The notification may include an indication of the role change, contact information of PINE2 for receiving future PIN management requests, a time duration in which PINE2 will serve as the new PEMC, and other information from the PIN profile.

At Step 6, if or when the original PEMC is able to resume management of the PIN, the PEMC may issue a request for a PIN role change to PINE2. Alternatively, the request may be issued by PINE2 when PINE2 detects that the original PEMC is back online, since PINE2 is the current PEMC. The request may include the PIN role change token so PINE2 can authenticate and authorize the role change operation. If the role change request is granted, PINE2 may return in the response the current state of the PIN profile and any other information it is using to manage the PIN.

At Step 7, the PEMC or PINE2 may send a PIN role change notification to all members of the PIN and may include the same information as that of Step 5.

Figure 4:
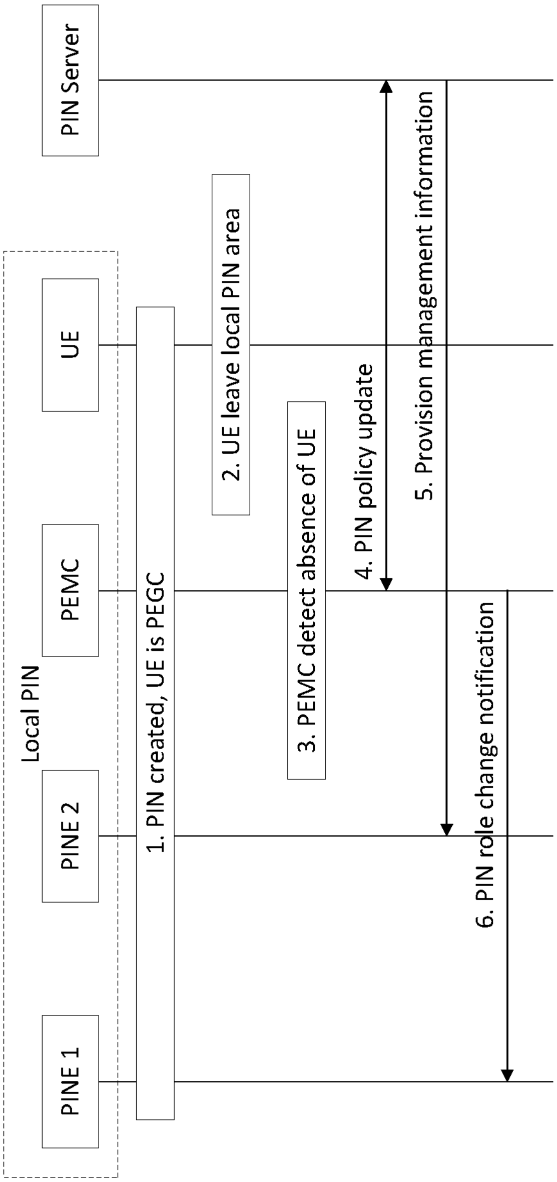
FIG. 4 depicts a process for PIN role change involving a PEGC

In the previous example, the PIN role change involved a PEMC in which the role change was required due to a software update or device upgrade to the existing PEMC. There may be other events which triggers a PIN role change involving a PEGC. FIG. 4 shows one such example in which a UE serving as a PEGC leaves the local PIN area and is no longer able to provide traffic routing for the PIN. The PEMC detects the UE's absence, possibly through a heartbeat mechanism or through a notification from another PIN element that traffic routing is not available, and proceeds to request the PIN server perform a role change for selecting a new PEGC. Note that the steps in the figure may be performed in an order other than that shown in the figure.

At Step 1, a local PIN may be created with PINE1, PINE2, PEMC, and a UE serving as a PEGC.

At Step 2, the UE may leave the local PIN area, e.g, the owner of the UE leaves the home.

At Step 3, the PEMC may detect that the UE has left the local coverage area of the PIN and is no longer providing PEGC functionality. The PEMC may perform this detection based on periodic heartbeat communications with the UE. Alternatively, PINE1 or PINE2 may have informed PEMC that PIN traffic routing is not available.

At Step 4, the PEMC may send a PIN policy update request to the PIN server to perform a PIN modification for a PEGC role change. The PEMC may include in the request the PIN ID, the PEMC ID, the PEGC ID of the UE, the ID of a PIN member that may serve as the new PEGC, and other information that is shown in Table 1. The PIN server may select the PIN member provided by the PEMC or another PIN member as the new PEGC for the PIN. The PIN server responds with the status for the request and may provide an update to the PIN profile maintained by the PEMC, e.g, the identifier of the new PEGC. The PIN server may indicate to the PEMC to notify other members of the PIN of the new PEGC.

At Step 5, the PIN server may send PINE2 management information from Table 1 and Table 2 for PINE2 to serve in the new role. The PIN server may provision PINE2 with traffic routing authorizations in order for PINE2 to route traffic remotely, e.g. external to the PIN.

At Step 6, the PEMC may send PIN role change notification(s) to other members of the PIN to indicate the new PEGC for the PIN. The notification may include an indication of the role change, contact information of PINE2 for receiving future PIN traffic routing requests, and other information from the PIN profile.

Figure 5:
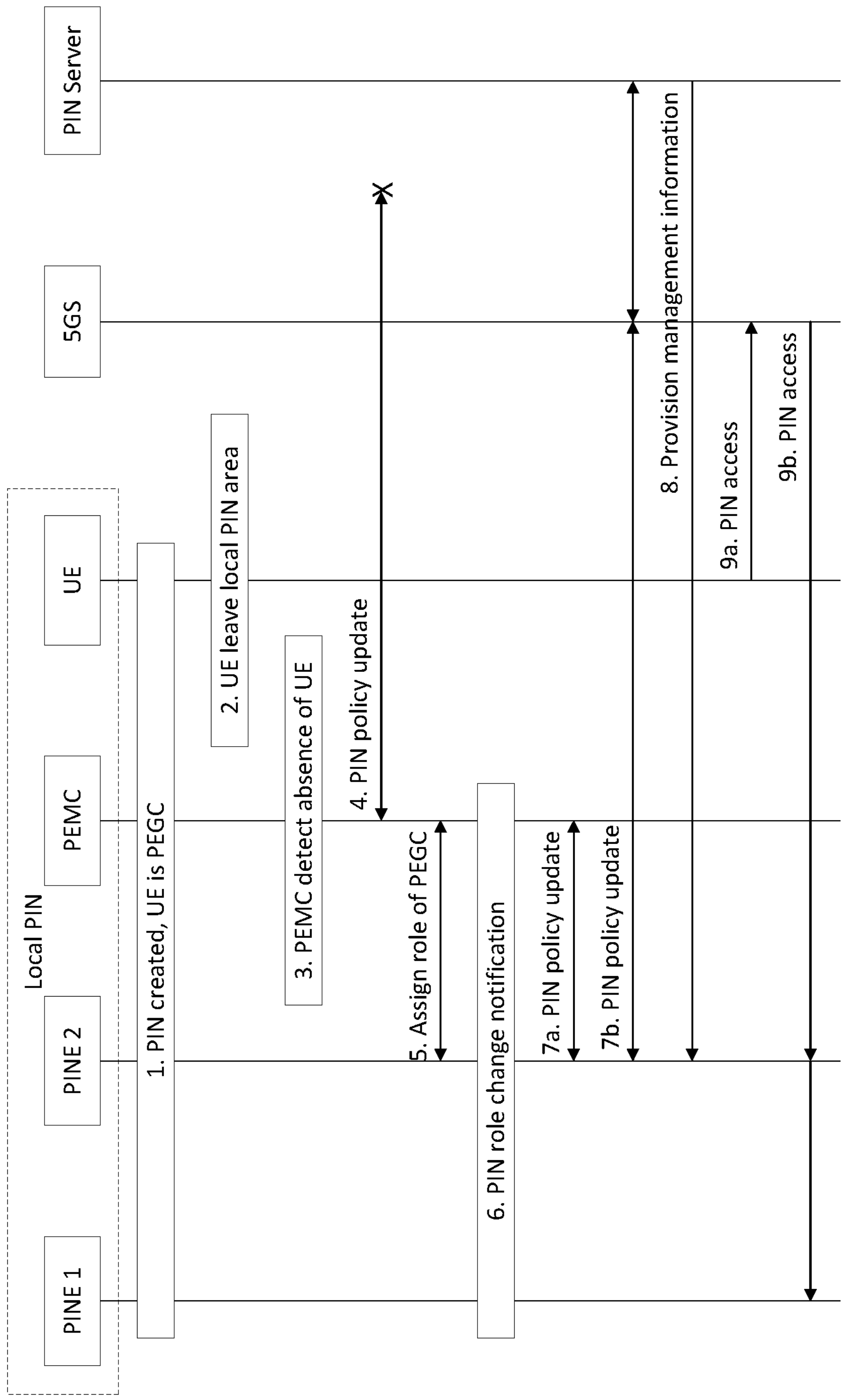
FIG. 5 depicts another process for PIN role change involving a PEGC.

The procedure of FIG. 4 shows the scenario in which the PEMC was able to request a PEGC role change from the PIN server upon detection of the UE leaving the local area of the PIN. It may be that in another scenario, the PEMC is not able to request the role change from the PIN server directly due to an internet connectivity issue with the home network or a temporary interruption to the PIN server. In that scenario and if the PEMC is authorized to make local PIN management decisions, e.g. as indicated by the Role Change Configuration informational element or authorized by operator policy, the PEMC may assign a PIN member with the role of the new PEGC and then inform the PIN server when connectivity is restored. FIG. 5 shows an alternative scenario in which the PEMC performs the PEGC local role change and then informs the PIN server of the role change through the 5G network. The scenario provides a level of autonomy for either an authorized administrator or the PEMC to perform local PIN management if authorized by the PIN server. In the scenario of FIG. 5, the local PIN management may enable connectivity to be restored for members of the PIN by using network resources of the 5G network, i.e. the 3GPP access network.

At Step 1, a local PIN may be created with PINE1, PINE2, PEMC, and a UE serving as a PEGC.

At Step 2, the UE may leave the local PIN area, e.g, the owner of the UE leaves the home.

At Step 3, the PEMC may detect that the UE has left the local coverage area of the PIN and is no longer providing the PEGC functionality. The PEMC may perform this detection based on periodic heartbeat communications with the UE. Alternatively, PINE1 or PINE2 may have informed PEMC that PIN traffic routing is not available.

At Step 4, the PEMC may send a PIN policy update request to the PIN server to perform a PIN modification for a PEGC role change. The request may be unable to be completed possibly due to connectivity issues with the home network, e.g. internet connectivity is down or not available. Alternatively, the PIN server may not be available or is experiencing a temporary interruption.

At Step 5, if the PEMC is authorized to perform local role changes, the PEMC may inform PINE2 that it is to serve as the new PEGC and may provide the appropriate PIN profile information to PINE2, such as the PIN routing authorization and the data traffic limit. The PIN routing authorization may be limited such that PINE2 can only route traffic from the PEMC, e.g. to perform a PIN policy update to the PIN server. The PEMC may have used information from the PIN profile to make the determination of which PIN elements within the PIN could serve as the new PEGC. The PEMC may also use the PINE capability enhancements as previously proposed in Table 1 to select the new PEGC. PINE2 may need to establish a PDU session with the 5GS to support remote PIN traffic routing.

At Step 6, after the new PEGC has been assigned, the PEMC or new PEGC may notify the other members of the PIN of the role change. The notification may include an indication of the role change, contact information of PINE2 for receiving future PIN traffic routing requests, and other information from the PIN profile.

At Step 7, if PEMC is still not able to contact the PIN server, e.g. home internet connectivity is still not available, the PEMC may send a PIN policy update request to the PIN server via PINE2 using the previously created PDU session with the 5GS. PINE2 may establish the PDU session with the 5GS to provide network connectivity via operator managed spectrum. The request may include a PIN ID, the PEMC ID, the PEGC ID, the ID of a PIN member that may serve as the new PEGC, and other information that is shown in Table 1. In response to the PIN policy update, the PIN server may return PIN traffic authorization to enable PINE2 to route PIN data traffic through the 5GS.

At Step 8, the PIN server may send PINE2 management information from Table 1 and Table 2 for PINE2 to serve in the new role. The PIN server may provision PINE2 with updated traffic routing authorizations in order for PINE2 to route traffic remotely, e.g. outside of the PIN.

At Step 9, the UE, which is now outside the local coverage area of the PIN but is still a member of the PIN, may access members of the PIN over the 5GS. The UE may have requested membership persistency during PIN registration to enable the UE to leave the local area of the PIN without being removed from the PIN. A PIN element without membership persistency may be automatically removed from the PIN upon detection by the PEMC that the PIN element is no longer responding to PIN communications. The UE may have been provisioned with network slice and data network name information to create a PDU session for communications with the PIN and the PIN server that authorized the creation of the PIN. In addition, the UE may obtain the PEGC contact information (e.g. URI, FQDN, IP address, etc.) and the PIN element list from the PIN profile it maintains for being a member of the PIN to access any member of the PIN that it is authorized to access. The communication may be sent over the 5GS, to PINE2 which is serving as the new PEGC, and finally to PINE1.

An alternative variation of the example of FIG. 5 may be that before the UE leaves the local PIN area, the UE may request a PIN role change either with the PEMC or another PIN element. The UE may be able to determine from the PIN profile which PIN element within the PIN is able to serve as the new PEGC or the UE may make the request to the PEMC and let the PEMC determine which PIN element is able to serve as the new PEGC. The UE may then transfer the PIN profile information it has maintained to the new PEGC, including any PIN traffic routing information it may have been provisioned by the PIN server.

Figure 6:
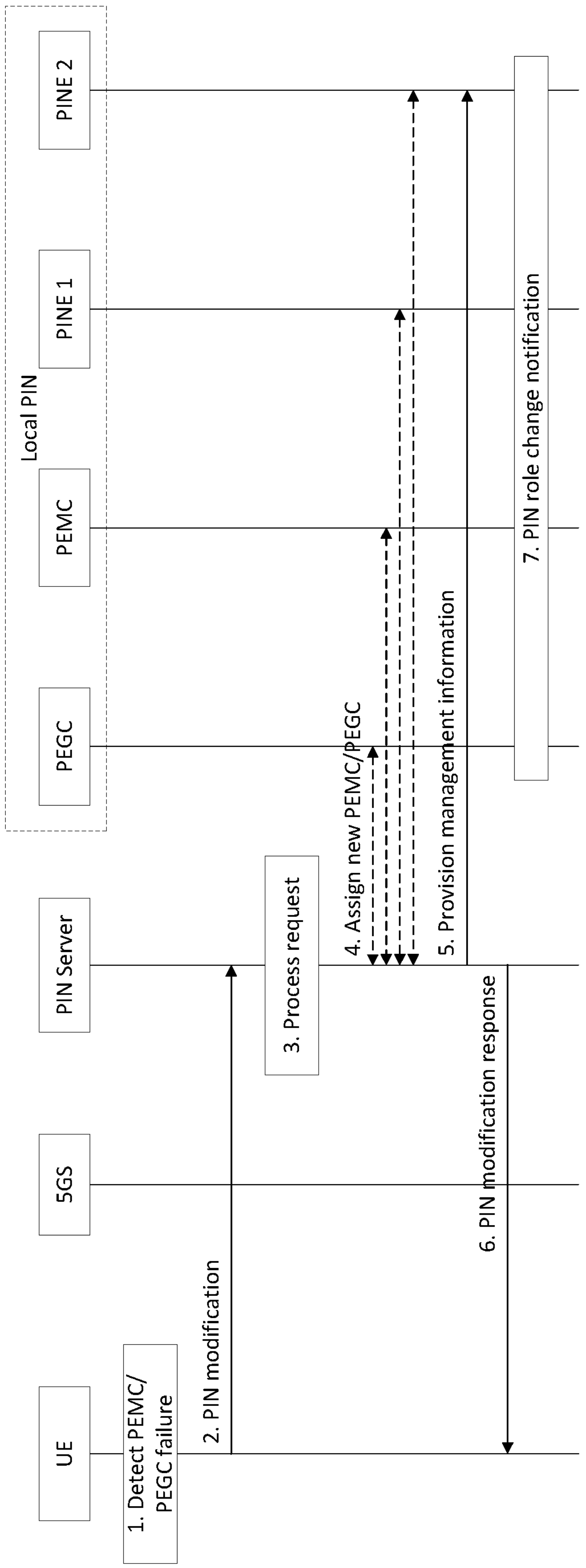
FIG. 6 depicts a process for a UE requested PIN role change.

Sometimes during PIN operation, a PIN element may fail without warning, either the battery has died or one of the device's component fails. For these cases, and especially if the PIN element that fails is one serving as a PEMC or a PEGC, the management and/or routing capability of the PIN may no longer be available. During these scenarios, an authorized administrator may need to intervene to restore the operation of the PIN. FIG. 6 shows an example of such a situation. The authorized administrator is represented by the UE in the figure and is outside the local area of the PIN. The UE may be a member of the PIN with membership persistency. The UE detects that there is a failure with either the PEMC or PEGC, possibly through a dashboard application on the UE or the UE is unable to communicate with the PIN. The UE then makes a PIN modification request to the PIN server to perform a PIN role change for the PEMC or PEGC that failed. Note that the steps in the figure may be performed in an order other than that shown in the figure.

At Step 1, a UE, which may be an authorized administrator of a local PIN, is outside the coverage area of the local PIN. The UE may still be a member of the PIN and detects an issue with the operation of either the PEMC or the PEGC of the PIN. The UE may have application layer information, e.g. from an application dashboard on the UE, indicating the PEMC is not available or the PEGC is not routing PIN traffic to the 5GS or to other PINS in the home.

At Step 2, using the PIN profile information stored locally on the UE, the UE may make a PIN modification request to the PIN Server that had authorized the creation of the PIN. The UE may include in the request the UE ID, the PIN ID, an indication for a role change of either the PEMC or the PEGC for the PIN, the role change token for authorizing the role change, the PINE identifier selected by the UE for the new role, a reason for the role change, etc. The UE may make the request using the services of the 5G network or using PINAAP application layer traffic.

At Step 3, the PIN server may process the request, including the authentication and authorization of the UE if necessary, and may evaluate the provided token to ensure the role change is authorized. The PIN server may use information in the PIN profile of the associated PIN ID and local operator policy to determine if the UE is authorized to select a PINE for the new role, whether the selected PINE has the capability to serve in the new role, whether to override the UE selected PINE, what management information are required for the role change, PIN routing authorization, etc.

At Step 4, after the PIN server has processed the request and made a determination for allowing the role change, the PIN server may send a PIN role change request to the PEMC. PEGC, or a PIN element that may be able to serve the role of PEMC or PEGC. The request may include the PIN ID, the purpose for the modification request, the assignment of role change for either PEMC or PEGC, the PINE ID of the PINE assigned to the new role, and other information from the PIN profile. The PEMC, PEGC, or PIN element may return a response to the PIN server indicating the acceptance of the role change.

At Step 5, the PIN server may send management information to the selected PIN element for the new role and may include in the request information from a PIN profile with the appropriate management or traffic routing information for the PIN element to start managing the PIN or to enable the traffic routing of the PIN. The PIN profile may include information as outlined in Table 1 and Table 2. Note that steps 4 and 5 may be combined together into one step.

At Step 6, the PIN server may return a response to the UE with a status of the PIN modification request. The response may include information such as information listed in Table 1 that was applied to the role change, e.g. management or PIN traffic routing information.

At Step 7, the new PEMC or PEGC may send notification(s) to the other members of the PIN indicating the role change. For a role change of PEMC, the other PINEs may make management requests for refreshing or deleting registration to the PIN and for a role change of PEGC, the other PINEs may make traffic routing requests for PIN traffic. The notification message may be broadcast, groupcast, or unicast to other members of the PIN and may include an indication of a role change, contact information of PINE2 for receiving future PIN management or traffic routing requests, and other information from the PIN profile.

Figure 7:
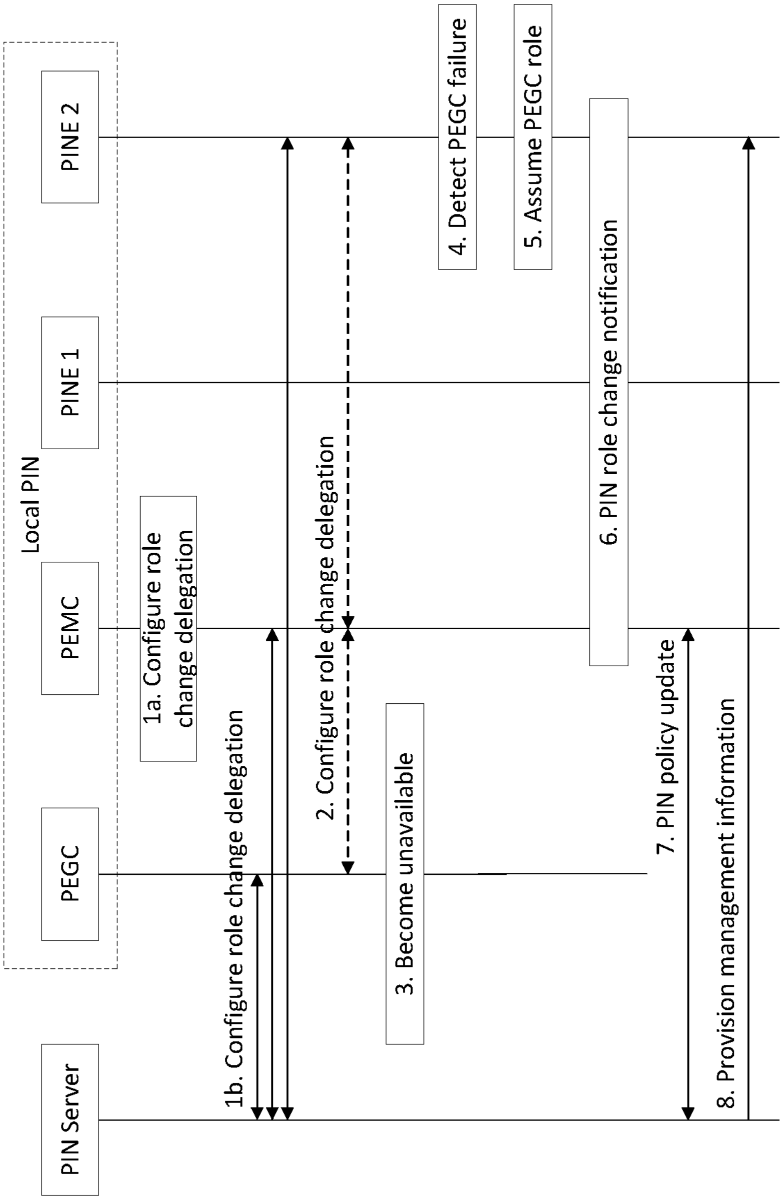
FIG. 7 depicts a process for PIN role change delegation.

In the previous examples, the PIN role change was initiated by a requesting entity, whether the requesting entity is an authorized administrator, a PEMC, a PEGC or a user of a UE. A more proactive mechanism may be employed in which the PIN role change may be delegated and performed autonomously based on configuration of the PIN profile. Using the Role Change Configuration and Role Change Sequence informational element of the PIN profile, a user or PIN server may be able to configure autonomous PIN role changes upon the detection of a triggering event, such as the failure of a PIN element to respond to PIN communications. FIG. 7 shows an example of PIN role change delegation to enable autonomous PIN role change. In the example, PEGC and PINE2 are PIN elements with gateway capability and as a result, both are configured in the Role Change Sequence for PEGC functionality. PEGC is configured to be the default or first priority PIN element with gateway capability and PINE2 as the second priority PIN element with gateway capability. After some time, PEGC fails and is unable to support PIN traffic routing. PINE2 detects that PEGC is not available, possibly not receiving a response from PEGC for routing PIN traffic to the 5GS. PINE2 checks that PIN Role Change Sequence is available and autonomously execute the PIN role change. Note that the steps in the figure may be performed in an order other than that shown in the figure.

At Step 1, an authorized administrator may configure a PEMC for PIN role change delegation if the PIN server has authorized PIN role change delegation in the PIN profile. Alternatively, the PIN server may configure the PIN role change delegation function on the PEGC, PEMC, or any PIN elements that have the corresponding management or gateway capability. In this example, the Role Change Sequence is configured for PEGC and PINE2 for gateway capability delegation: PEGC is the higher priority PIN element while PINE2 is the lower priority PIN element. PINE2 may assume PEGC functionality should it detect that PEGC was unavailable. Similarly, PEMC may also detect the unavailability of PEGC and notify PINE2 to serve as the PEGC. The PIN server may provision management or gateway information that the PIN elements may use to manage or route PIN traffic, respectively.

At Step 2, if the authorized administrator had configured the PEMC for PIN role change delegation, PEMC may configure PEGC and PINE2 with the PIN role change delegation information, e.g, the Role Change Sequence information element.

At Step 3, after some time, PEGC becomes unavailable, possibly due to a device or battery failure or the fact the PEGC is no longer in the coverage area of the local PIN.

At Step 4, PINE2 may detect that PEGC is no longer available in the PIN to route traffic. PINE2 may have tried to send PIN communications to the 5GS but did not receive a response from PEGC.

At Step 5, using the Role Change Sequence information, PINE2 may determine that it is next in line to serve as the gateway capable PIN element and assumes the role of PEGC.

At Step 6, PINE2 may sends a notification to members on the PIN indicating the role change. The notification message may be broadcast, groupcast, or unicast to other members of the PIN and may include an indication of a role change, contact information of PINE2 for receiving future PIN traffic routing requests, and other information from the PIN profile.

At Step 7, the PEMC may perform a PIN policy update to inform the PIN server that autonomous PIN role change had taken place and that PINE2 is serving as the new PEGC. The PEMC may include in the request the PIN ID, the PEMC ID, the PEGC ID, the ID of a PIN member that may serve as the new PEGC, and other information that are shown in Table 1.

At Step 8, if the PIN server had not previously provisioned PIN traffic routing information to PINE2 in Step 1, the PIN server may send PIN traffic routing authorization to PINE2. The PIN server may provide other management information as shown in Table 1 and Table 2 the PINE2 may need to serve in the new role.

FIG. 7 shows one example of autonomous role change and other examples may be envisioned. For example, a PEGC may detect that the PEMC has failed and based on the Role Change Sequence, determine which PINE to assign the role of the new PEMC. The PEGC may even assume the role of PEMC if the PIN profile was configured as such. Similarly, a PEMC may assume the role of a PEGC upon detecting that the PEGC has failed if it is authorized by the PIN profile.

Figure 8:
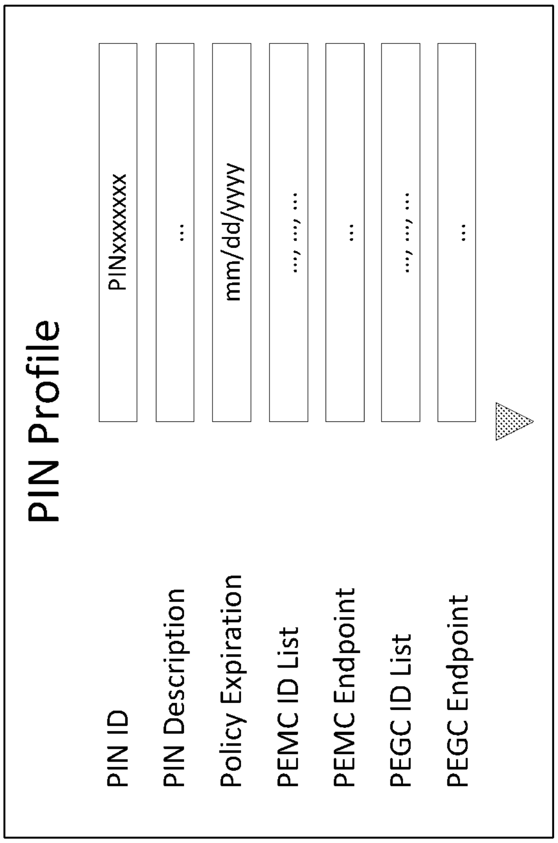
FIGS. 8 and 9 depict graphical user interfaces (GUIs) for managing role changes in PINs.
Figure 9:
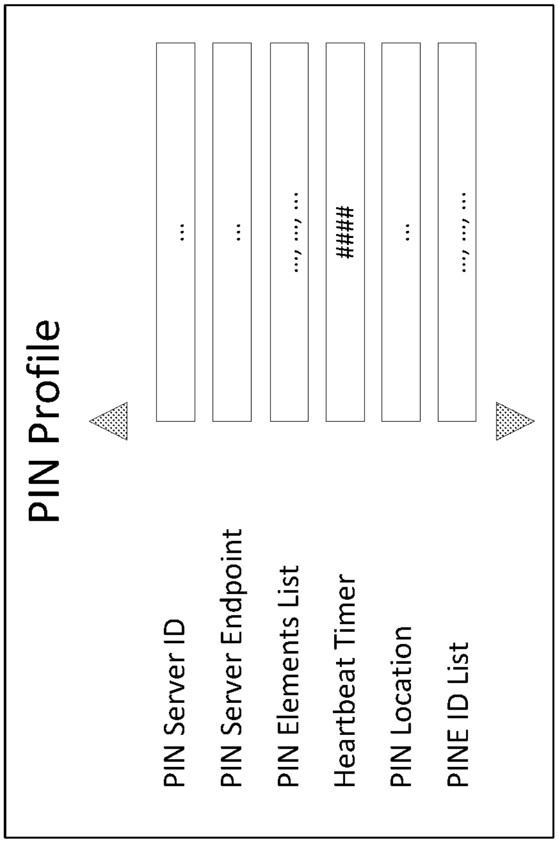

FIG. 8 and FIG. 9 show two example graphical user interfaces that a UE may present to a user to list the contents of a PIN profile as described in Table 1. The GUI may scroll vertically to display all informational elements. Some informational elements may be provisioned by a PIN server (e.g. PIN ID, Policy Expiration, PIN Server ID, PIN Server Endpoint, PINE ID List) while other informational elements may be configured by an authorized administrator (e.g. PIN Description, certain information in the PIN Elements List). The PIN client on a UE may also provide information to the PIN profile, e.g, the PEMC and PEGC Endpoint and certain information in the PIN Elements List.

Example Communications System

The 3rd Generation Partnership Project (3GPP) develops technical standards for cellular telecommunications network technologies, including radio access, the core transport network, and service capabilities-including work on codecs, security, and quality of service. Recent radio access technology (RAT) standards include WCDMA (commonly referred as 3G), LTE (commonly referred as 4G), LTE-Advanced standards, and New Radio (NR), which is also referred to as "8G". 3GPP NR standards development is expected to continue and include the definition of next generation radio access technology (new RAT), which is expected to include the provision of new flexible radio access below 7 GHZ, and the provision of new ultra-mobile broadband radio access above 7 GHz. The flexible radio access is expected to consist of a new; non-backwards compatible radio access in new spectrum below 7 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for. e.g., indoor applications and hotspots. In particular, the ultra-mobile broadband is expected to share a common design framework with the flexible radio access below 7 GHZ, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

Figure 10A:
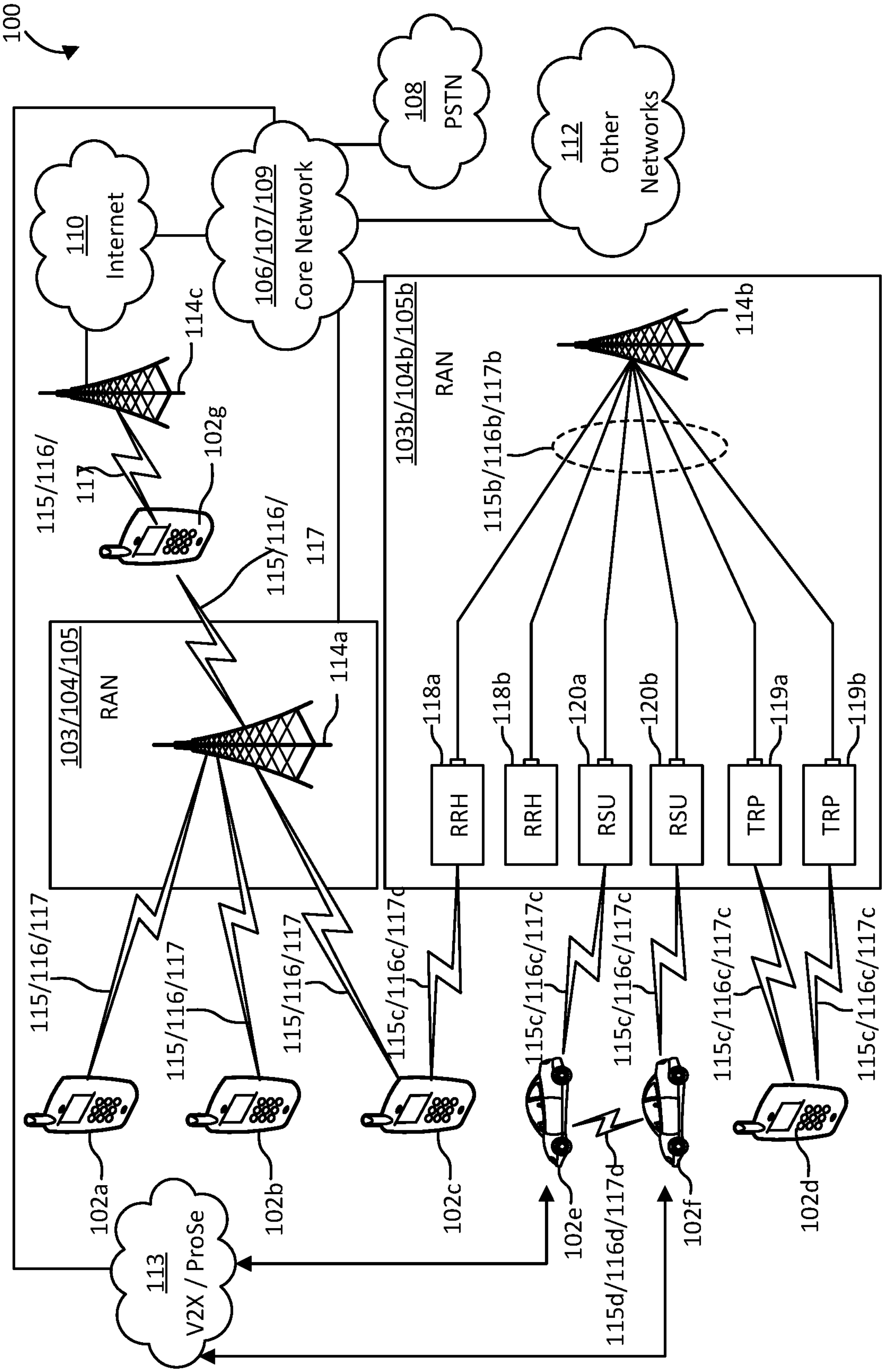

FIG. 10A illustrates an example communications system 100 in which the methods and apparatuses described and claimed herein may be an aspect of. As shown, the example communications system 100 may include wireless transmit/receive units (WTRUs) 102*a*, 102*b*, 102*c*, 102*d*, 102*e*, 102*f*, and/or 102*g* (which generally or collectively may be referred to as WTRU 102), a radio access network (RAN) 103/104/105/103*b*/104*b*/108B, a core network 106/107/109, a public switched telephone network (PSTN) 108, the Internet 110, other networks 112, and V2X server (or ProSe function and server) 113, though it will be appreciated that the disclosed examples contemplate any number of WTRUs, base stations, networks, and/or network elements. Each of the WTRUs 102*a*, 102*b*, 102*c*, 102*d*, 102*e*, 102*f*, 102*g* may be any type of apparatus or device configured to operate and/or communicate in a wireless environment. Although each WTRU 102*a*, 102*b*, 102*c*, 102*d*, 102*e*, 102*f*, 102*g* is depicted in FIGS. 9A-9E as a hand-held wireless communications apparatus, it is understood that with the wide variety of use cases contemplated for 8G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114*a* and a base station 114*b*. Base stations 114*a* may be any type of device configured to wirelessly interface with at least one of the WTRUs 102*a*, 102*b*, 102*c* to facilitate access to one or more communication networks, such as the core network 106/107/109, the Internet 110, and/or the other networks 112. Base stations 114*b* may be any type of device configured to wiredly and/or wirelessly interface with at least one of the RRHs (Remote Radio Heads) 118*a*, 118*b*, TRPs (Transmission and Reception Points) 119*a*, 119*b*, and/or RSUs (Roadside Units) 120*a* and 120*b* to facilitate access to one or more communication networks, such as the core network 106/107/109, the Internet 110, the other networks 112, and/or V2X server (or ProSe function and server) 113. RRHs 118*a*, 118*b* may be any type of device configured to wirelessly interface with at least one of the WTRU 102*c*, to facilitate access to one or more communication networks, such as the core network 106/107/109, the Internet 110, and/or the other networks 112. TRPs 119*a*, 119*b* may be any type of device configured to wirelessly interface with at least one of the WTRU 102*d*, to facilitate access to one or more communication networks, such as the core network 106/107/109, the Internet 110, and/or the other networks 112. RSUs 120*a* and 120*b* may be any type of device configured to wirelessly interface with at least one of the WTRU 102*e* or 102*f*, to facilitate access to one or more communication networks, such as the core network 106/107/109, the Internet 110, the other networks 112, and/or V2X server (or ProSe function and server) 113. By way of example, the base stations 114*a*, 114*b* may be a base transceiver station (BTS), a Node-B, an eNode B, a Home Node B, a Home eNode B, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 103/104/105, which may also include other base stations and/or network elements (not shown), such as a base station controller (BSC), a radio network controller (RNC), relay nodes, etc. The base station 114*b* may be part of the RAN 103*b*/104*b*/108B, which may also include other base stations and/or network elements (not shown), such as a base station controller (BSC), a radio network controller (RNC), relay nodes, etc. The base station 114*a* may be configured to transmit and/or receive wireless signals within a particular geographic region, which may be referred to as a cell (not shown). The base station 114*b* may be configured to transmit and/or receive wired and/or wireless signals within a particular geographic region, which may be referred to as a cell (not shown). The cell may further be divided into cell sectors. For example, the cell associated with the base station 114*a* may be divided into three sectors. Thus, the base station 114*a* may include three transceivers, e.g., one for each sector of the cell. In some cases, the base station 114*a* may employ multiple-input multiple output (MIMO) technology and, therefore, may utilize multiple transceivers for each sector of the cell.

The base stations 114*a* may communicate with one or more of the WTRUs 102*a*, 102*b*, 102*c* over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114*b* may communicate with one or more of the RRHs 118*a*, 118*b*, TRPs 119*a*, 119*b*, and/or RSUs 120*a* and 120*b*, over a wired or air interface 118B/116*b*/117*b*, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 118B/116*b*/117*b* may be established using any suitable radio access technology (RAT).

The RRHs 118*a*, 118*b*, TRPs 119*a*, 119*b* and/or RSUs 120*a*, 120*b*, may communicate with one or more of the WTRUs 102*c*, 102*d*, 102*e*, 102*f* over an air interface 118C/116*c*/117*c*, which may be any suitable wireless communication link (e.g., radio frequency (RF), microwave, infrared (IR), ultraviolet (UV), visible light, cmWave, mmWave, etc.). The air interface 118C/116*c*/117*c* may be established using any suitable radio access technology (RAT).

The WTRUs 102*a*, 102*b*, 102*c*, 102*d*, 102*e*, 102*f*, and/or 102*g* may communicate with one another over an air interface 118D/116*d*/117*d* (not shown in the figures), which may be any suitable wireless communication link (e.g., radio frequency (RF), microwave, infrared (IR), ultraviolet (UV), visible light, cmWave, mmWave, etc.). The air interface 118D/116*d*/117*d* may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 103/104/105 and the WTRUs 102*a*, 102*b*, 102*c*, or RRHs 118*a*, 118*b*, TRPs 119*a*, 119*b* and RSUs 120*a*, 120*b*, in the RAN 103*b*/104*b*/108B and the WTRUs 102*c*, 102*d*, 102*e*, 102*f*, may implement a radio technology such as Universal Mobile Telecommunications System (UMTS) Terrestrial Radio Access (UTRA), which may establish the air interface 115/116/117 or 118C/116*c*/117*c* respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In some cases, the base station 114*a* and the WTRUs 102*a*, 102*b*, 102*c*, or RRHs 118*a*, 118*b*, TRPs 119*a*, 119*b*, and/or RSUs 120*a*, 120*b*, in the RAN 103*b*/104*b*/108B and the WTRUs 102*c*, 102*d*, may implement a radio technology such as Evolved UMTS Terrestrial Radio Access (E-UTRA), which may establish the air interface 115/116/117 or 118C/116*c*/117*c* respectively using Long Term Evolution (LTE) and/or LTE-Advanced (LTE-A). In the future, the air interface 115/116/117 may implement 3GPP NR technology. The LTE and LTE-A technology includes LTE D2D and V2X technologies and interface (such as Sidelink communications, etc.) The 3GPP NR technology includes NR V2X technologies and interface (such as Sidelink communications, etc.)

In some cases, the base station 114*a* in the RAN 103/104/105 and the WTRUs 102*a*, 102*b*, 102*c*, or RRHs 118*a*, 118*b*, TRPs 119*a*, 119*b* and/or RSUs 120*a*, 120*b*, in the RAN 103*b*/104*b*/108B and the WTRUs 102*c*, 102*d*, 102*e*, 102*f* may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*c* in FIG. 10A may be a wireless router, Home Node B, Home eNode B, or access point, for example, and may utilize any suitable RAT for facilitating wireless connectivity in a localized area, such as a place of business, a home, a vehicle, a campus, and the like. In some cases, the base station 114*c* and the WTRUs 102*e*, may implement a radio technology such as IEEE 802.11 to establish a wireless local area network (WLAN). In some cases, the base station 114*c* and the WTRUs 102*d*, may implement a radio technology such as IEEE 802.15 to establish a wireless personal area network (WPAN). In some cases, the base station 114*c* and the WTRUs 102*e*, may utilize a cellular-based RAT (e.g., WCDMA, CDMA2000, GSM, LTE, LTE-A, etc.) to establish a picocell or femtocell. As shown in FIG. 10A, the base station 114*b* may have a direct connection to the Internet 110. Thus, the base station 114*c* may not be required to access the Internet 110 via the core network 106/107/109.

The RAN 103/104/105 and/or RAN 103*b*/104*b*/108B may be in communication with the core network 106/107/109, which may be any type of network configured to provide voice, data, applications, and/or voice over internet protocol (VOIP) services to one or more of the WTRUs 102*a*, 102*b*, 102*c*, 102*d*. For example, the core network 106/107/109 may provide call control, billing services, mobile location-based services, pre-paid calling, Internet connectivity, video distribution, etc., and/or perform high-level security functions, such as user authentication.

Although not shown in FIG. 10A, it will be appreciated that the RAN 103/104/105 and/or RAN 103*b*/104*b*/108B and/or the core network 106/107/109 may be in direct or indirect communication with other RANs that employ the same RAT as the RAN 103/104/105 and/or RAN 103*b*/104*b*/108B or a different RAT. For example, in addition to being connected to the RAN 103/104/105 and/or RAN 103*b*/104*b*/108B, which may be utilizing an E-UTRA radio technology, the core network 106/107/109 may also be in communication with another RAN (not shown) employing a GSM radio technology.

The core network 106/107/109 may also serve as a gateway for the WTRUS 102*a*, 102*b*, 102*c*, 102*d*, 102*e* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103*b*/104*b*/108B or a different RAT.

Some or all of the WTRUs 102*a*, 102*b*, 102*c*, 102*d* in the communications system 100 may include multi-mode capabilities, e.g., the WTRUs 102*a*, 102*b*, 102*c*. 102*d*, and 102*e* may include multiple transceivers for communicating with different wireless networks over different wireless links. For example, the WTRU 102*e* shown in FIG. 10A may be configured to communicate with the base station 114*a*, which may employ a cellular-based radio technology, and with the base station 114*c*, which may employ an IEEE 802 radio technology.

Figure 10B:
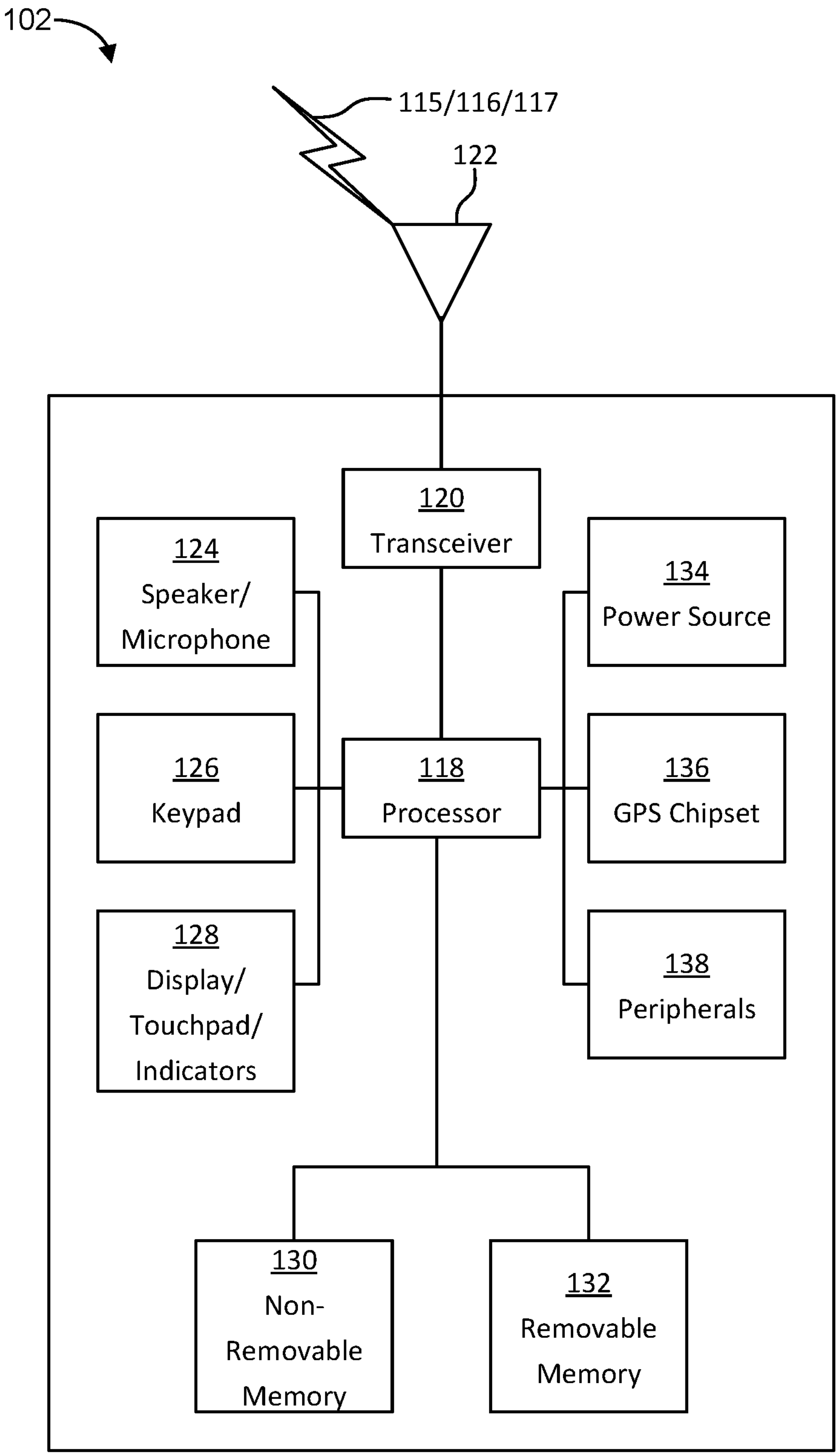
FIG. 10B depicts a block diagram of an example apparatus or device configured for wireless communications.

FIG. 10B is a block diagram of an example apparatus or device configured for wireless communications in accordance with the aspects illustrated herein, such as for example, a WTRU 102. As shown in FIG. 10B, the example WTRU 102 may include a processor 118, a transceiver 120, a transmit/receive element 122, a speaker/microphone 124, a keypad 113, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an example. Also, in some cases the base stations 114*a* and 114*b*, and/or the nodes that base stations 114*a* and 114*b* may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 10B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 10B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 115/116/117. For example, in some cases, the transmit/receive element 122 may be an antenna configured to transmit and/or receive RF signals. In some cases, the transmit/receive element 122 may be an emitter/detector configured to transmit and/or receive IR, UV, or visible light signals, for example. In some cases, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 10B as a single element, the WTRU 102 may include any number of transmit/receive elements 122. More specifically, the WTRU 102 may employ MIMO technology. Thus, in some cases, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In some cases, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an aspect.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 10C:
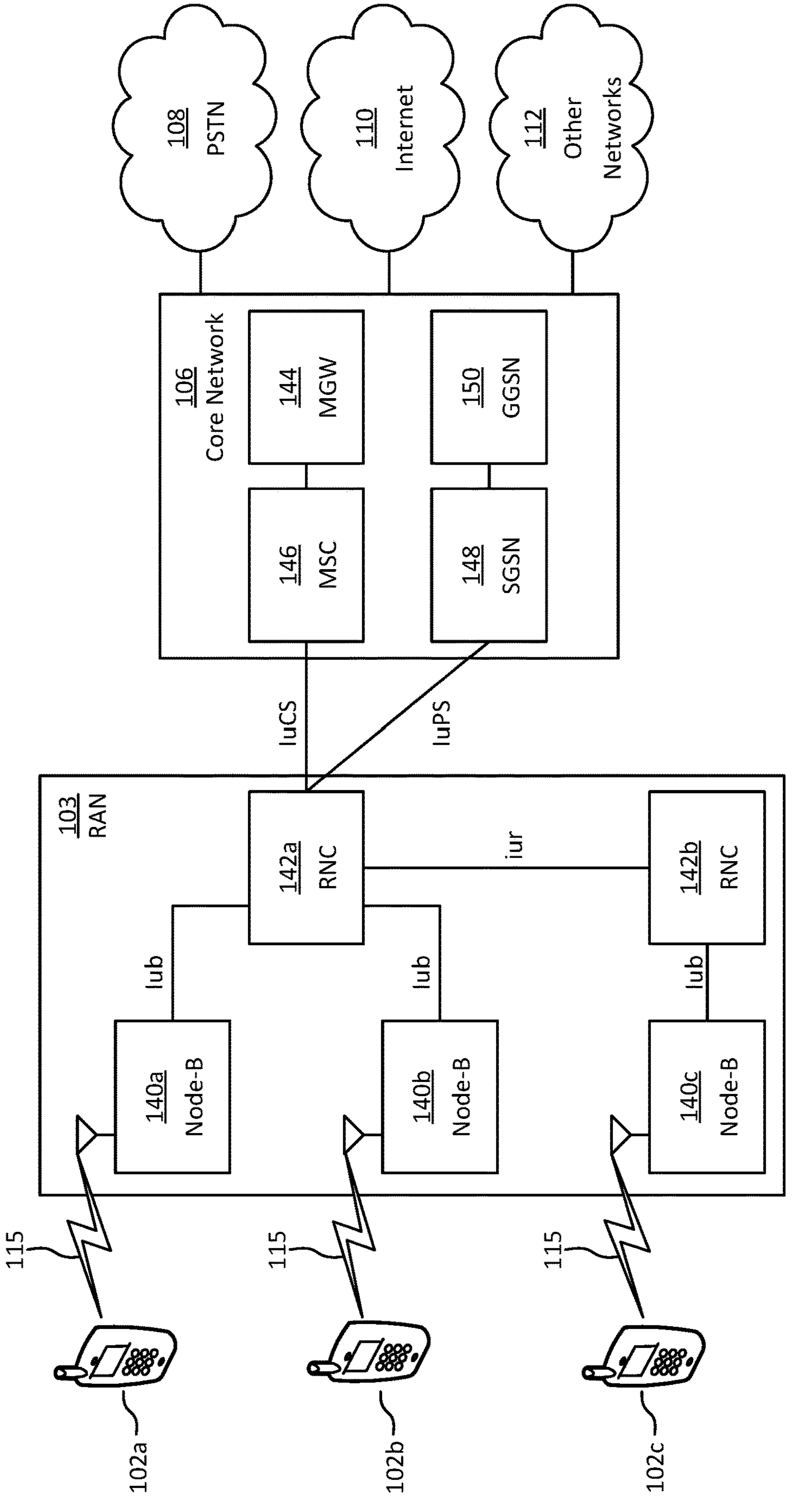
FIG. 10C depicts a system diagram of an example radio access network (RAN) and core network.

FIG. 10C is a system diagram of the RAN 103 and the core network 106. As noted above, the RAN 103 may employ a UTRA radio technology to communicate with the WTRUs 102*a*, 102*b*, and 102*c* over the air interface 115. The RAN 103 may also be in communication with the core network 106. As shown in FIG. 10C, the RAN 103 may include Node-Bs 140*a*, 140*b*, 140*c*, which may each include one or more transceivers for communicating with the WTRUs 102*a*, 102*b*, 102*c* over the air interface 115. The Node-Bs 140*a*, 140*b*, 140*c* may each be associated with a particular cell (not shown) within the RAN 103. The RAN 103 may also include RNCs 142*a*, 142*b*. It will be appreciated that the RAN 103 may include any number of Node-Bs and RNCs while remaining consistent with an aspect of the disclosure.

As shown in FIG. 10C, the Node-Bs 140*a*, 140*b* may be in communication with the RNC 142*a*. Additionally, the Node-B 140*c* may be in communication with the RNC 142*b*. The Node-Bs 140*a*, 140*b*, 140*c* may communicate with the respective RNCs 142*a*, 142*b* via an Iub interface. The RNCs 142*a*, 142*b* may be in communication with one another via an Iur interface. Each of the RNCs 142*a*, 142*b* may be configured to control the respective Node-Bs 140*a*, 140*b*, 140*c* to which it is connected. In addition, each of the RNCs 142*a*, 142*b* may be configured to carry out or support other functionality, such as outer loop power control, load control, admission control, packet scheduling, handover control, macro-diversity, security functions, data encryption, and the like.

The core network 106 shown in FIG. 10C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142*a* in the RAN 103 may be connected to the MSC 146 in the core network 106 via an IuCS interface. The MSC 146 may be connected to the MGW 144. The MSC 146 and the MGW 144 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices.

The RNC 142*a* in the RAN 103 may also be connected to the SGSN 148 in the core network 106 via an IuPS interface. The SGSN 148 may be connected to the GGSN 150. The SGSN 148 and the GGSN 150 may provide the WTRUs 102*a*, 102*b*, 102*c* with access to packet-switched networks, such as the Internet 110, to facilitate communications between and the WTRUs 102*a*, 102*b*, 102*c* and IP-enabled devices.

As noted above, the core network 106 may also be connected to the networks 112, which may include other wired or wireless networks that are owned and/or operated by other service providers.

Figure 10D:
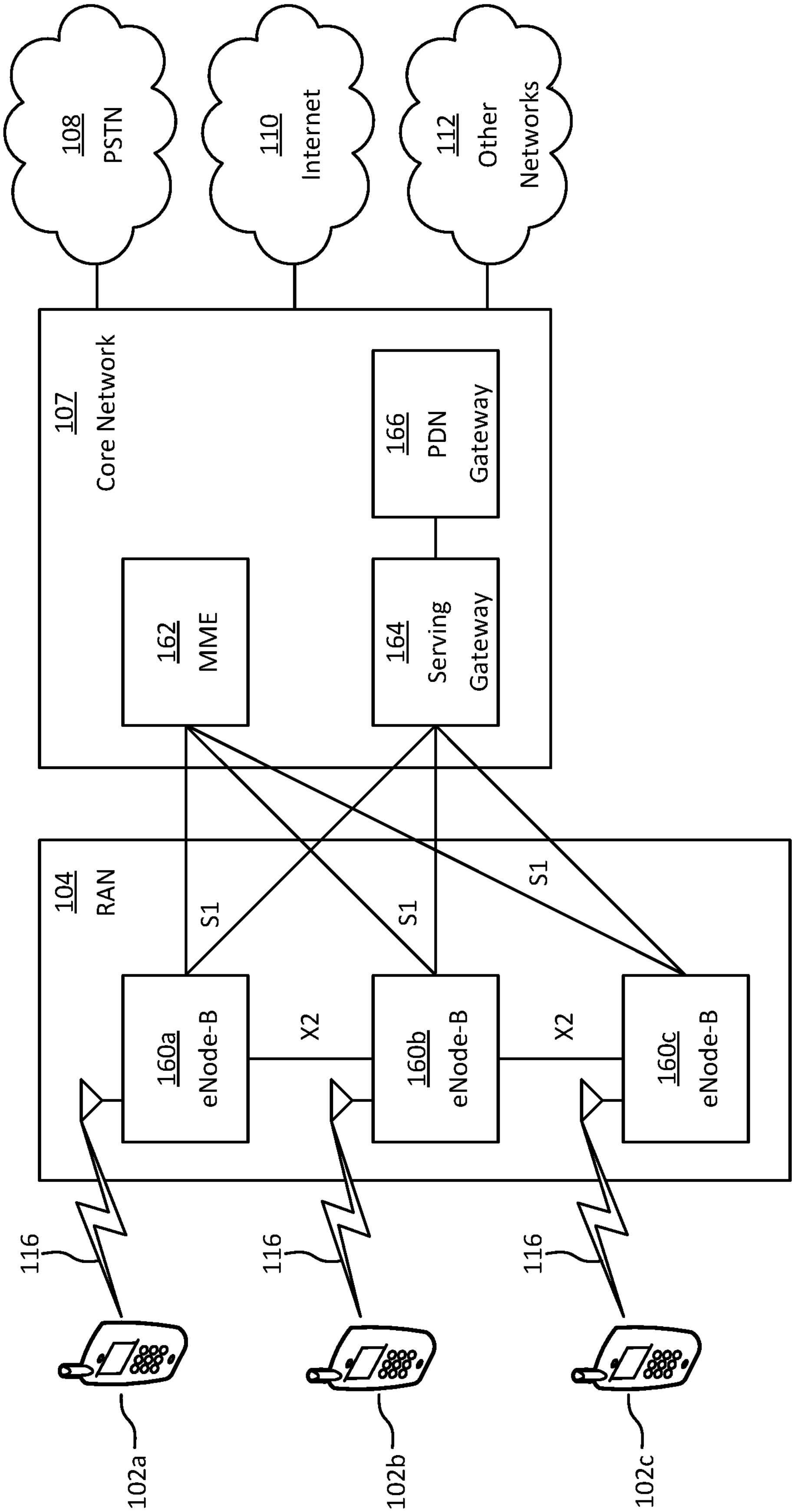
FIG. 10D depicts a system diagram of another example RAN and core network.

FIG. 10D is a system diagram of the RAN 104 and the core network 107. As noted above, the RAN 104 may employ an E-UTRA radio technology to communicate with the WTRUs 102*a*, 102*b*, and 102*c* over the air interface 116. The RAN 104 may also be in communication with the core network 107.

The RAN 104 may include eNode-Bs 160*a*, 160*b*, 160*c*, though it will be appreciated that the RAN 104 may include any number of eNode-Bs while remaining consistent with an aspect of the disclosure. The eNode-Bs 160*a*, 160*b*, 160*c* may each include one or more transceivers for communicating with the WTRUs 102*a*, 102*b*, 102*c* over the air interface 116. In some cases, the eNode-Bs 160*a*, 160*b*, 160*c* may implement MIMO technology. Thus, the eNode-B 160*a*, for example, may use multiple antennas to transmit wireless signals to, and receive wireless signals from, the WTRU 102*a*.

Each of the eNode-Bs 160*a*, 160*b*, and 160*c* may be associated with a particular cell (not shown) and may be configured to handle radio resource management decisions, handover decisions, scheduling of users in the uplink and/or downlink, and the like. As shown in FIG. 10D, the eNode-Bs 160*a*, 160*b*, 160*c* may communicate with one another over an X2 interface.

The core network 107 shown in FIG. 10D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160*a*. 160*b*, and 160*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160*a*, 160*b*, and 160*c* in the RAN 104 via the S1 interface. The serving gateway 164 may generally route and forward user data packets to/from the WTRUs 102*a*, 102*b*, 102*c*. The serving gateway 164 may also perform other functions, such as anchoring user planes during inter-eNode B handovers, triggering paging when downlink data is available for the WTRUs 102*a*, 102*b*, 102*c*, managing and storing contexts of the WTRUs 102*a*, 102*b*, 102*c*, and the like.

The serving gateway 164 may also be connected to the PDN gateway 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The core network 107 may facilitate communications with other networks. For example, the core network 107 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102*a*, 102*b*, 102*c* with access to the networks 112, which may include other wired or wireless networks that are owned and/or operated by other service providers.

Figure 10E:
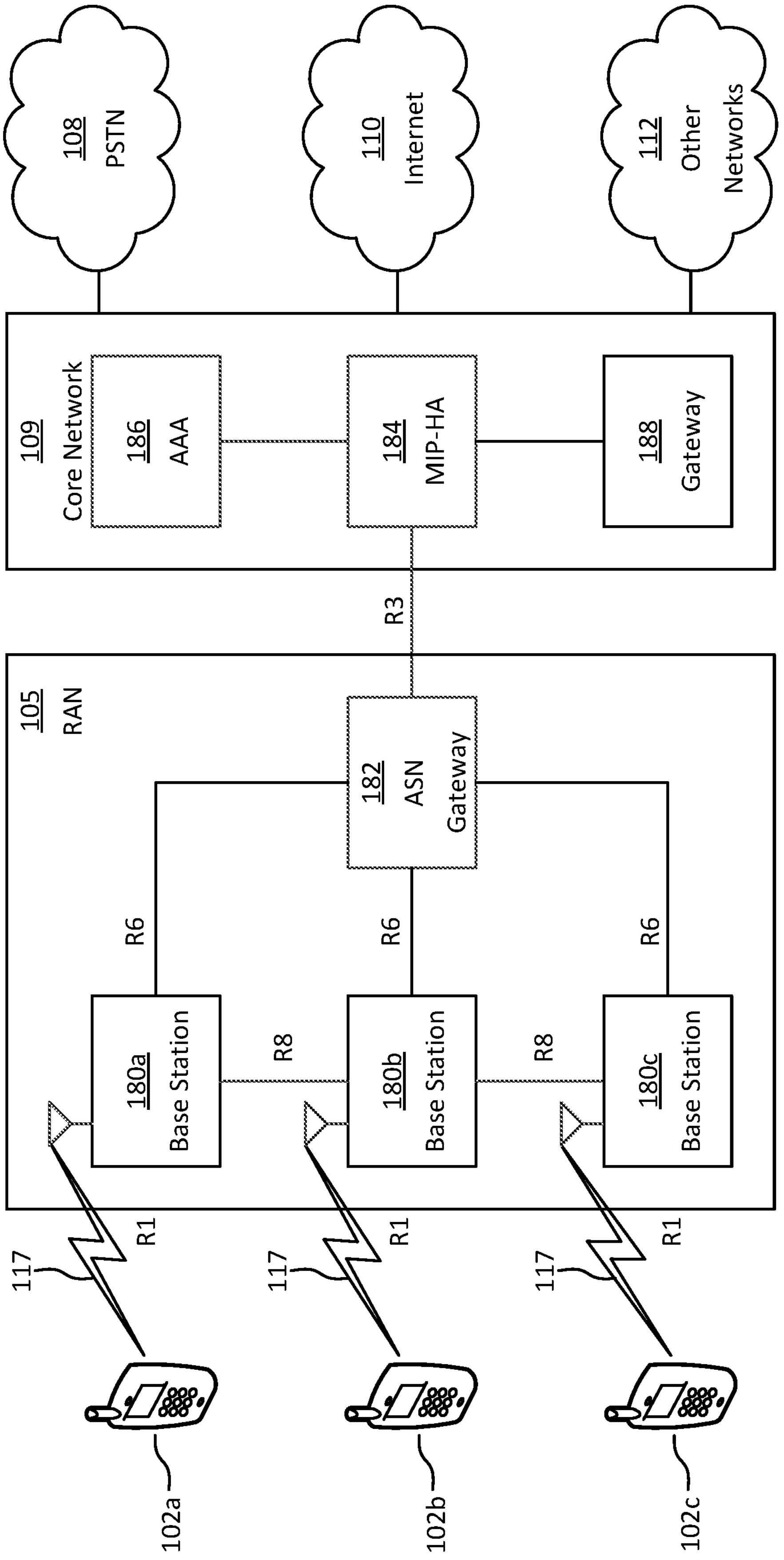
FIG. 10E depicts a system diagram of another example RAN and core network.

FIG. 10E is a system diagram of the RAN 105 and the core network 109. The RAN 105 may be an access service network (ASN) that employs IEEE 802.16 radio technology to communicate with the WTRUs 102*a*, 102*b*, and 102*c* over the air interface 117. As will be further discussed below, the communication links between the different functional entities of the WTRUs 102*a*, 102*b*, 102*c*, the RAN 105, and the core network 109 may be defined as reference points.

As shown in FIG. 10E, the RAN 105 may include base stations 180*a*, 180*b*, 180*c*, and an ASN gateway 182, though it will be appreciated that the RAN 105 may include any number of base stations and ASN gateways while remaining consistent with an aspect of the disclosure. The base stations 180*a*, 180*b*, 180*c* may each be associated with a particular cell in the RAN 105 and may include one or more transceivers for communicating with the WTRUs 102*a*, 102*b*, 102*c* over the air interface 117. In some cases, the base stations 180*a*, 180*b*, 180*c* may implement MIMO technology. Thus, the base station 180*a*, for example, may use multiple antennas to transmit wireless signals to, and receive wireless signals from, the WTRU 102*a*. The base stations 180*a*, 180*b*, 180*c* may also provide mobility management functions, such as handoff triggering, tunnel establishment, radio resource management, traffic classification, quality of service (QOS) policy enforcement, and the like. The ASN gateway 182 may serve as a traffic aggregation point and may be responsible for paging, caching of subscriber profiles, routing to the core network 109, and the like.

The air interface 117 between the WTRUs 102*a*, 102*b*, 102*c* and the RAN 105 may be defined as an R1 reference point that implements the IEEE 802.16 specification. In addition, each of the WTRUs 102*a*, 102*b*, and 102*c* may establish a logical interface (not shown) with the core network 109. The logical interface between the WTRUs 102*a*, 102*b*, 102*c* and the core network 109 may be defined as an R2 reference point, which may be used for authentication, authorization, IP host configuration management, and/or mobility management.

The communication link between each of the base stations 180*a*, 180*b*, and 180*c* may be defined as an R8 reference point that includes protocols for facilitating WTRU handovers and the transfer of data between base stations. The communication link between the base stations 180*a*, 180*b*, 180*c* and the ASN gateway 182 may be defined as an R6 reference point. The R6 reference point may include protocols for facilitating mobility management based on mobility events associated with each of the WTRUs 102*a*, 102*b*, 102*c*.

As shown in FIG. 10E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102*a*, 102*b*, and 102*c* to roam between different ASNs and/or different core networks. The MIP-HA 184 may provide the WTRUs 102*a*, 102*b*, 102*c* with access to packet-switched networks, such as the Internet 110, to facilitate communications between the WTRUs 102*a*, 102*b*, 102*c* and IP-enabled devices. The AAA server 186 may be responsible for user authentication and for supporting user services. The gateway 188 may facilitate interworking with other networks. For example, the gateway 188 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. In addition, the gateway 188 may provide the WTRUs 102*a*, 102*b*, 102*c* with access to the networks 112, which may include other wired or wireless networks that are owned and/or operated by other service providers.

Although not shown in FIG. 10E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102*a*, 102*b*, 102*c* between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 9A, 9C, 9D, and 9E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 9A, 9B, 9C, 9D, and 9E are provided by way of example only, and it is understood that the subject matter disclosed and claimed herein may be embodied or implemented in any similar communication system, whether presently defined or defined in the future.

Figure 10F:
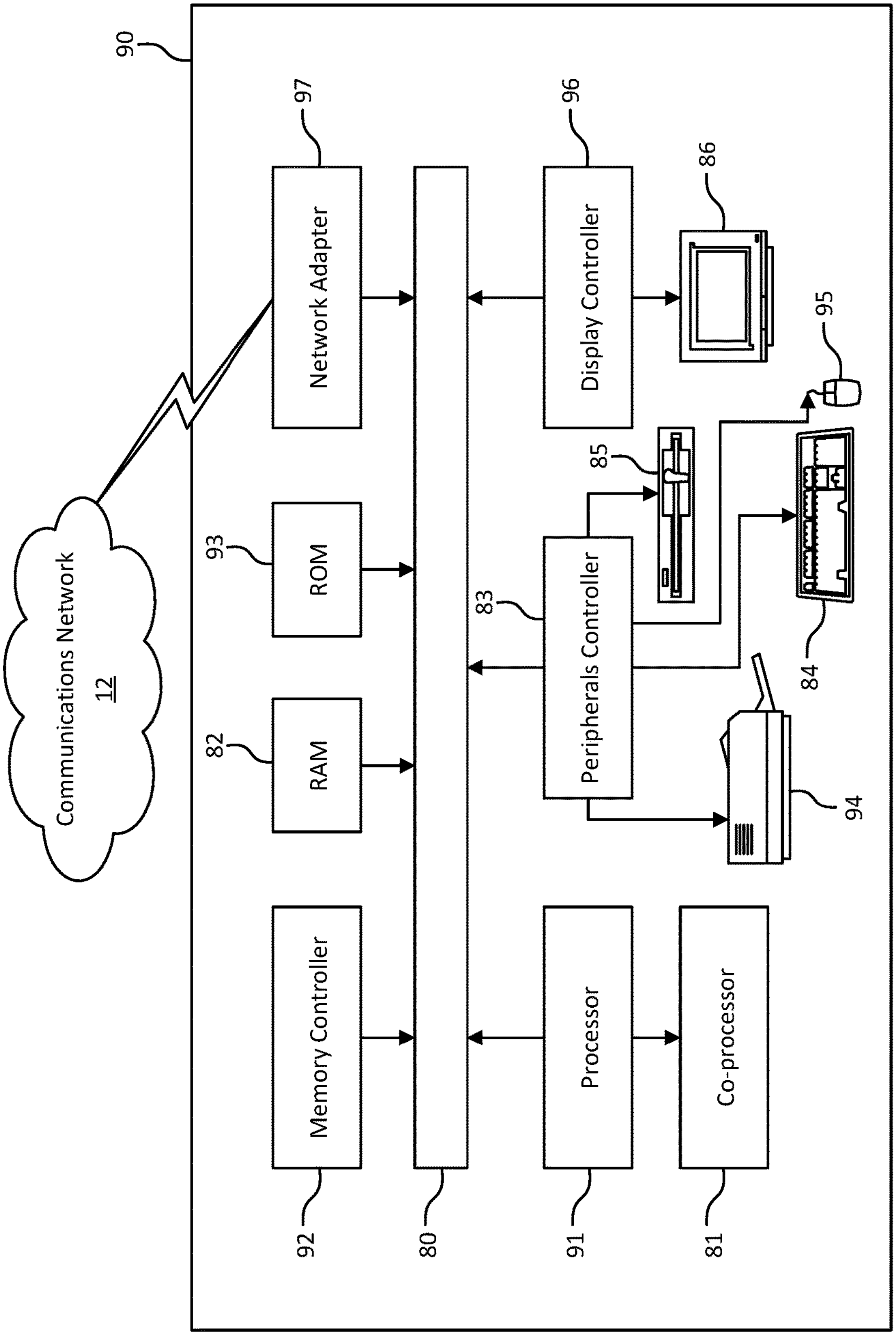
FIG. 10F depicts a block diagram of an example computing system.

FIG. 10F is a block diagram of an exemplary computing system 90 in which one or more apparatuses of the communications networks illustrated in FIGS. 9A, 9C, 9D and 9E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space: it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 9A, 9B, 9C, 9D, and 9E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

Figure 10G:
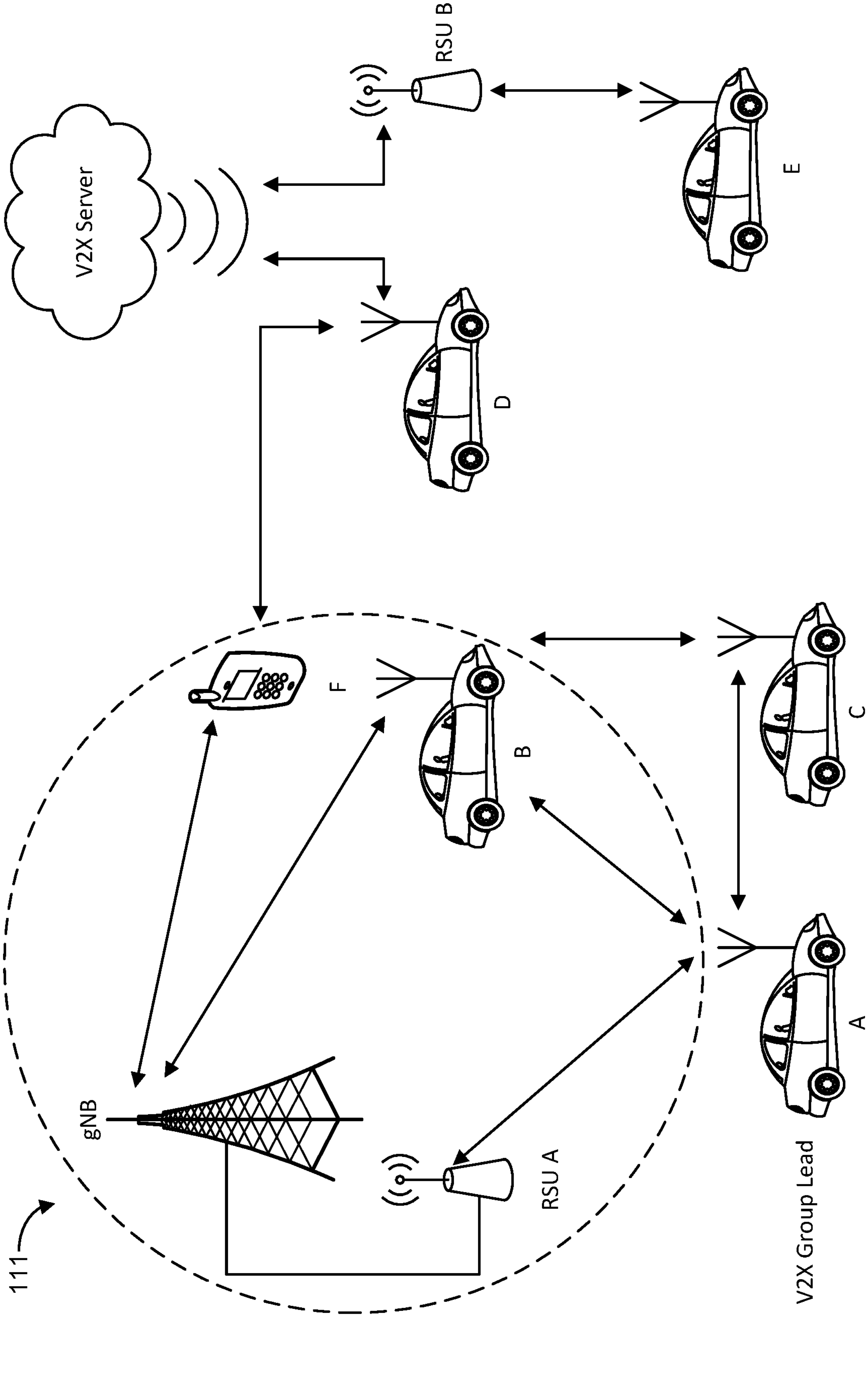
FIG. 10G depicts a block diagram of another example communications system.

FIG. 10G illustrates an example communications system 111 in which the methods and apparatuses described and claimed herein may be an aspect of. As shown, the example communications system 111 may include wireless transmit/receive units (WTRUs) A, B, C, D, E, F, a base station, a V2X server, and a RSUs A and B, though it will be appreciated that the disclosure contemplates any number of WTRUs, base stations, networks, and/or network elements. One or several or all WTRUs A, B, C, D, E can be out of range of the network (for example, in the figure out of the cell coverage boundary shown as the dash line). WTRUs A, B, C form a V2X group, among which WTRU A is the group lead and WTRUs B and C are group members. WTRUs A, B, C, D, E, F may communicate over Uu interface or Sidelink (PC5) interface.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

Definitions

Provided below are definitions for abbreviations found within the body of the disclosure.

Further, note that the use of the term "PIN" in this disclosure refers to the PINAPP architecture and the associated procedures performed at the application enabler layer(s) with their respective informational elements. In addition, the terms "PIN profile" and "PIN policy" are used inter-changeably to represent the informational elements that are used to manage the operations of a PIN. Finally, the figures in this disclosure may show steps with bi-directional arrows between two entities to represent request-response message pairs.

| | |
|---|---|
| 3GPP | Third Generation Partnership Project |
| 5GS | 5G System |
| AF | Application Function |
| API | Application Programming Interface |
| AS | Application Server |
| FQDN | Fully Qualified Domain Name |
| GUI | Graphical User Interface |

-continued

| | |
|---|---|
| IoT | Internet of Things |
| MNO | Mobile Network Operator |
| NEF | Network Exposure Function |
| PCF | Policy Control Function |
| PEGC | PIN Element with Gateway Capability |
| PEMC | PIN Element with Management Capability |
| PIN | Personal IoT Network |
| PINAPP | Personal IoT Network Application (enabler layer) |
| PINE | PIN Element |
| ProSe | Proximity-based Services |
| RAN | Radio Access Network |
| SIM | Subscriber Identity Modules |
| UE | User Equipment |
| VAL | Vertical Application Layer |

What is claimed:

1. A method comprising:
initiating, by a Personal IoT Network (PIN) Element with Management Capability (PEMC) of a PIN, a PIN role change procedure;
determining, by the PEMC, a target PIN element (PINE) to transfer a PEMC functionality to;
sending, by the PEMC, a PIN role change request to the target PINE; and
sending, by the PEMC, a PIN policy update notification indicating that the target PINE performs the PEMC functionality.

2. The method of claim 1, wherein a PIN update notification is sent to other PINEs of the PIN.

3. The method of claim 2, wherein the PIN update notification includes an indication of the PIN role change, contact information of the target PINE, a time duration the target PINE performs the PEMC functionality, profile information of the target PINE, or a combination thereof.

4. The method of claim 1, wherein the PIN policy update notification comprises identification information of the PIN, identification information of the PEMC, a time duration for the target PINE to perform the PEMC functionality, profile information of PINEs in the PIN, authentication information for the PEMC, or a combination thereof.

5. The method of claim 1, further comprising:
receiving, at the PEMC and from the target PINE, a response indicating acceptance of the PIN role change.

6. A method, comprising:
receiving, by a Personal IoT Network (PIN) server and from a wireless transmit/receive unit (WTRU), a PIN modification request;
sending, by the PIN server and to a PIN element (PINE), a PIN role change request indicative of a request for the PINE to perform a PIN Element Management Capability (PEMC) or a PIN Element Gateway Capability (PEGC) functionality;
receiving, by the PIN server and from the PINE, a message accepting the PIN role change request; and
sending, by the PIN server and to the WTRU, a response to the PIN modification request comprising updated PIN policy information according to the PIN role change.

7. The method of claim 6, wherein the PIN modification request comprises authorization credentials of the WTRU, identification information of the WTRU, identification information of the PIN, identification information of the PINE, an identification of the PEMC or the PEGC functionality, or a combination thereof.

8. The method of claim 6, wherein the sending of the PIN modification request is prompted by an operation failure of a PEMC or a PEGC of the PIN.

9. The method of claim 6, further comprising: sending, by the PIN server and to other PINEs of the PIN, a notification of the PIN role change of the PINE.

10. The method of claim 6, wherein WTRU is located outside of a local coverage area of the PIN.

11. A method, comprising:
determining, by a personal IoT network (PIN) Element Management Capability (PEMC) of a PIN, a PIN Element Gateway Capability (PEGC) of the PIN is not within a coverage area of the PIN;
sending, by the PEMC and to a PIN server, a request for the PIN server to perform a PEGC role change; and
receiving, by the PEMC and from the PIN server, a response that a PIN element (PINE) of the PIN is selected to perform PEGC functions for the PIN.

12. The method of claim 11, wherein the response further comprises an indication for the PEMC to notify other PINEs of the PIN of the PEGC role change.

13. The method of claim 12, further comprising: sending, by the PEMC and to other PINEs of the PIN, a notification of the PEGC role change.

14. The method of claim 11, wherein the determining comprises failing, by the PEMC, to receive a periodic heartbeat communication from the PEGC.

15. The method of claim 11, wherein the PEGC resides on a wireless transmit/receive unit (WTRU).

16. The method of claim 1, wherein
the target PINE is distinct from the PEMC, and
the PEMC and the target PINE reside on different wireless transmit/receive units (WTRUs) of the PIN.

* * * * *